(12) United States Patent
Murofushi et al.

(10) Patent No.: US 12,346,764 B2
(45) Date of Patent: Jul. 1, 2025

(54) ITEM INSPECTION SYSTEM, INSPECTION METHOD, AND INFORMATION PROCESSING APPARATUS

(71) Applicant: CANON KABUSHIKI KAISHA, Tokyo (JP)

(72) Inventors: Mitsuhide Murofushi, Shizuoka (JP); Tomoya Uehara, Shizuoka (JP); Kenichi Nakao, Shizuoka (JP); Yuki Nakajima, Kanagawa (JP); Kenichi Fujii, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/433,706

(22) Filed: Feb. 6, 2024

(65) Prior Publication Data
US 2024/0176964 A1 May 30, 2024

Related U.S. Application Data

(63) Continuation of application No. PCT/JP2022/024324, filed on Jun. 17, 2022.

(30) Foreign Application Priority Data

Aug. 26, 2021 (JP) ................. 2021-138255

(51) Int. Cl.
*G06K 7/10* (2006.01)
*G06Q 10/087* (2023.01)

(52) U.S. Cl.
CPC ....... *G06K 7/10297* (2013.01); *G06Q 10/087* (2013.01)

(58) Field of Classification Search
CPC .. G06K 7/10297; G06K 7/10; G06K 7/10316; G06Q 10/087; B65G 1/137; G01S 1/68
See application file for complete search history.

(56) References Cited

U.S. PATENT DOCUMENTS

| 8,411,592 | B2 | 4/2013 | Fujii et al. |
| 8,412,590 | B2 * | 4/2013 | Elliott ............... H04W 4/18 |
| | | | 705/26.9 |

(Continued)

FOREIGN PATENT DOCUMENTS

| JP | 2002-150241 A | 5/2002 |
| JP | 2013-209184 A | 10/2013 |

(Continued)

OTHER PUBLICATIONS

JP2012243245A—Actual article collation method in article management, article management system, and program and terminal for article management, 10 pages. (Year: 2024).*

(Continued)

*Primary Examiner* — Tuyen K Vo
(74) *Attorney, Agent, or Firm* — Venable LLP

(57) ABSTRACT

An item inspection system includes a portable system that reads information from a wireless device, a position estimation unit that estimates a position of the portable system based on reading of identification information from a first wireless device installed at a known position, and an inspection unit that inspects whether the item exists in a specific place based on reading of identification information from a second wireless device attached to an item. The portable system selectively operates in a first mode for position estimation and a second mode for the inspection. The inspection unit guides a user based on a position of the item and an estimated position of the portable system, and determines that the item exists in the specific place when the identification information has been read from the second wireless device in the second mode.

17 Claims, 23 Drawing Sheets

(56) References Cited

U.S. PATENT DOCUMENTS

| | | | |
|---|---|---|---|
| 8,654,679 | B2 | 2/2014 | Fujii |
| 8,693,373 | B2 | 4/2014 | Fujii et al. |
| 8,792,391 | B2 | 7/2014 | Fujii et al. |
| 8,830,703 | B2 | 9/2014 | Murofushi |
| 9,301,142 | B2 | 3/2016 | Fujii |
| 9,505,554 | B1* | 11/2016 | Kong .................... G06V 10/25 |
| 10,277,764 | B2 | 4/2019 | Kobayashi et al. |
| 10,944,327 | B2 | 3/2021 | Murofushi |
| 2002/0007325 | A1 | 1/2002 | Tomon |
| 2010/0070078 | A1* | 3/2010 | Kong .................... G06V 20/10 901/1 |
| 2010/0117798 | A1* | 5/2010 | Jenkins .................... H04Q 9/00 340/10.1 |
| 2018/0107969 | A1* | 4/2018 | Trivelpiece ............ B25J 9/1679 |
| 2018/0210455 | A1* | 7/2018 | Ando .................... G05D 1/0088 |
| 2019/0168787 | A1* | 6/2019 | Messinger ............. H04L 67/12 |
| 2022/0121831 | A1 | 4/2022 | Murofushi |
| 2024/0062597 | A1 | 2/2024 | Fujii et al. |
| 2024/0086657 | A1 | 3/2024 | Uehara |

FOREIGN PATENT DOCUMENTS

| | | | |
|---|---|---|---|
| JP | 5744785 | B2 | 7/2015 |
| JP | 2012-243245 | A | 12/2022 |

OTHER PUBLICATIONS

JP 5744785B2—Article for inspection method, portable terminal device, control program portable terminal device, and article search system, 9 pages. (Year: 2024).*

International Search Report and Written Opinion for International Patent Application No. PCT/JP2022/024324.

Co-pending U.S. Appl. No. 18/606,386, filed Mar. 15, 2024.

* cited by examiner

FIG. 7

| TARGET ITEM 371 | INSPECTION DEADLINE 372 | STATUS 373 | COMPLETION DATE & TIME 374 | PLACE 375 | COORDINATES 376 |
|---|---|---|---|---|---|
| IT01 | YMD1 | COMPLETED | T11 | PL01 | (U8, V8) |
| IT02 | YMD1 | COMPLETED | T12 | PL01 | (U9, V9) |
| ·· | ·· | ·· | ·· | ·· | ·· |
| IT01 | YMD2 | UNCOMPLETED | — | — | — |
| IT02 | YMD2 | UNCOMPLETED | — | — | — |
| ·· | ·· | ·· | ·· | ·· | ·· |

370

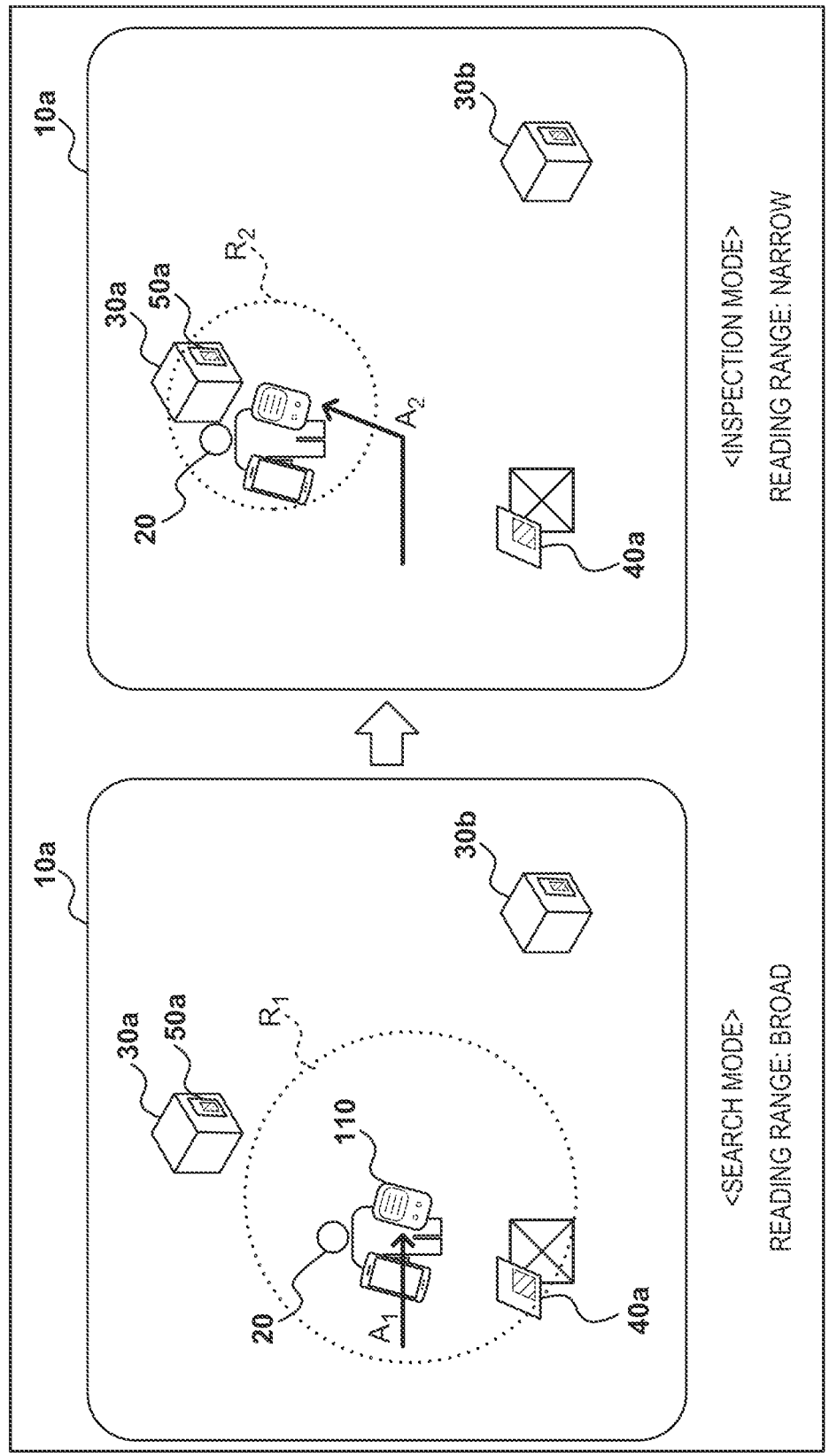

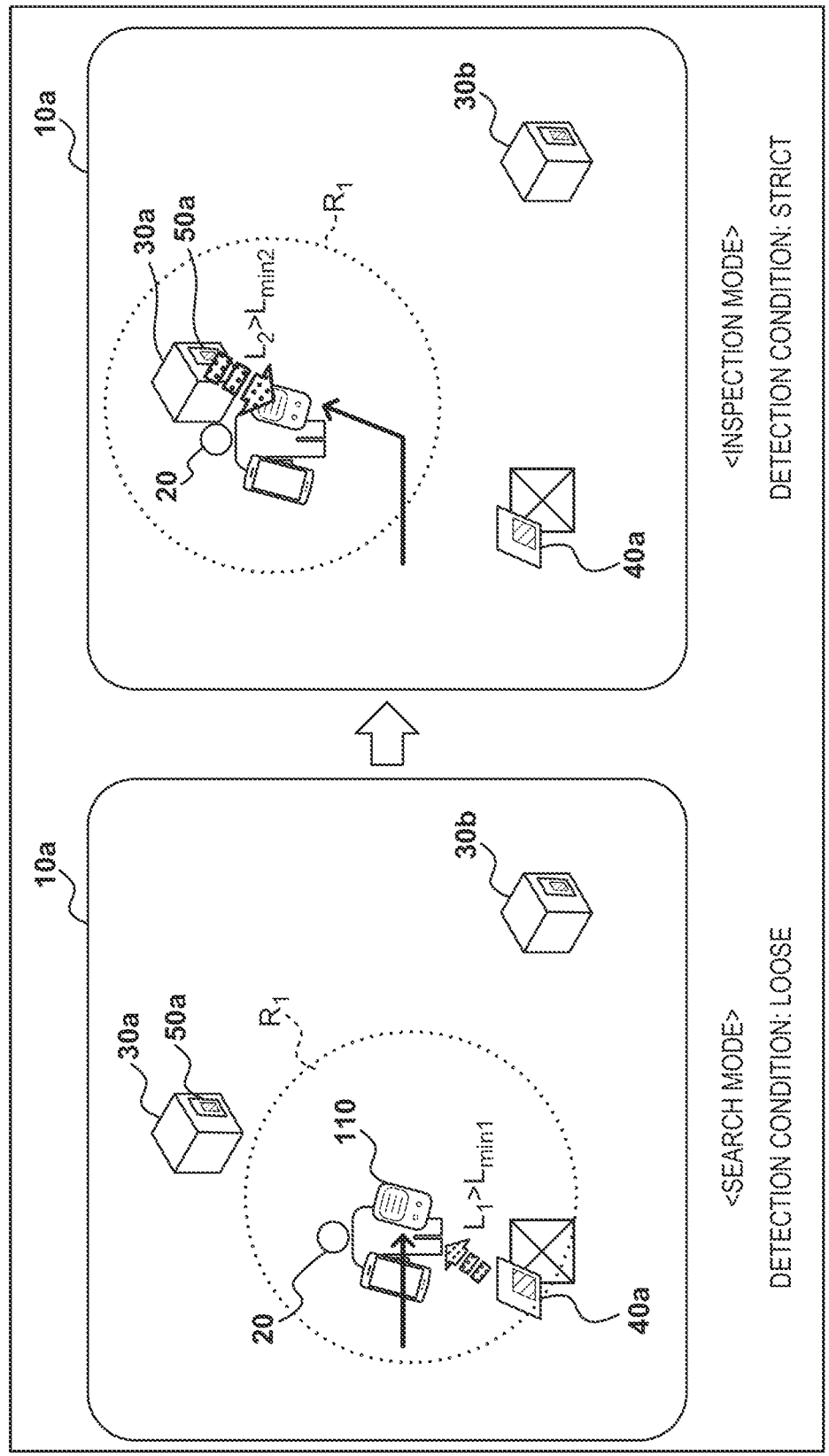

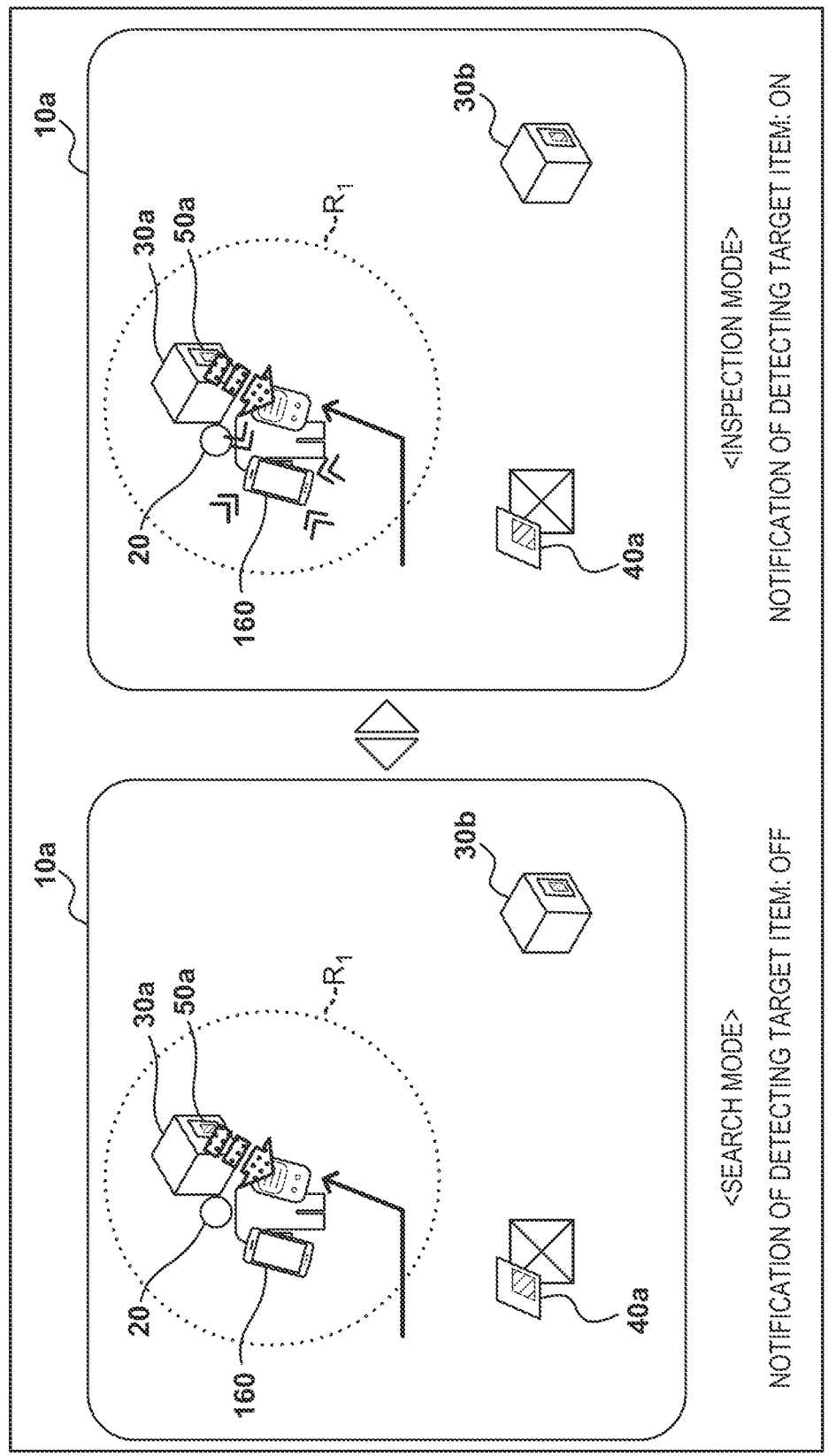

ITEM INSPECTION SYSTEM, INSPECTION METHOD, AND INFORMATION PROCESSING APPARATUS

CROSS-REFERENCE TO RELATED APPLICATIONS

This application is a Continuation of International Patent Application No. PCT/JP2022/024324, filed Jun. 17, 2022, which claims the benefit of Japanese Patent Application No. 2021-138255, filed Aug. 26, 2021, both of which are hereby incorporated by reference herein in their entirety.

BACKGROUND OF THE INVENTION

Field of the Invention

The present disclosure relates to an item inspection system, an inspection method, and an information processing apparatus.

Background Art

Radio frequency identification (RFID) is a technology that allows information embedded in a small device which is also referred to as a tag to be read by an external reader through short-range wireless communication. For example, an RFID tag in which unique identification information is embedded is attached to an item so that a location of the item can be efficiently known in item stock and distribution management and that visualization of information on managed items becomes easier. Among others, a passive type RFID tag, which transmits information utilizing energy of electromagnetic wave emitted from a reader, does not require a battery, leading to low manufacturing cost and semipermanent operation. Hence, it has become widely-used not only in the stock and distribution management but also in various applications.

Patent Literature 1 discloses an example of a system which makes use of RFID tags for item stock management purpose. The system of Patent Literature 1 can easily determine, at timings of arrival, shipping and inventory counting, stock statuses by a server gathering and processing information that has been read by a reader (also referred to as a scanner) from RFID tags attached to items, for example.

Patent Literature 2 discloses an example of a system that employs RFID tags to enhance efficiency of inspection on arrangement of equipment in a passenger cabin of an aircraft. The system of Patent Literature 2 guides a user using a display of a portable terminal and, in the meantime, detects an RFID tag with temporarily-weakened electromagnetic waves to determine that visual check for the equipment has done by the user at a predetermined place.

CITATION LIST

Patent Literature

PTL 1: Japanese Patent Laid-Open No. 2002-150241
PTL 2: Japanese Patent Laid-Open No. 2013-209184

The passenger cabin of an aircraft that is a target of the system disclosed by Patent Literature 2 is a closed space, and thus the equipment will not move across multiple spaces. As the appropriate arrangement of the equipment is basically constant, it is easy to guide a user to an intended point. In contrast, in general situations of checking locations of items such as inventory counting in stock management, the items may have moved to arbitrary places, and it is not always known in advance where each item is.

In light of the foregoing, the present invention aims at providing a mechanism to allow for efficient inspection on locations of items that may move to arbitrary places.

SUMMARY OF THE INVENTION

According to an aspect, there is provided an item inspection system including: a first wireless device installed at a known position; a second wireless device attached to an item; a portable system that includes a reading unit capable of reading, from a wireless device, identification information stored in the wireless device; a position estimation unit configured to estimate a position of the portable system based on a result of reading of identification information from the first wireless device by the reading unit; and an inspection unit configured to inspect whether the item exists in a specific place based on a result of reading of identification information from the second wireless device by the reading unit, wherein the portable system is capable of operating in one of a plurality of operation modes including a first operation mode for the estimation of a position of the portable system and a second operation mode for the inspection on the item, and the inspection unit is configured to: guide a user who uses the portable system for the inspection based on a position of the item indicated by position information stored in a database and a position of the portable system estimated by the position estimation unit; and determine that the item exists in the specific place in response to the identification information being read from the second wireless device by the reading unit while the portable system is operating in the second operation mode. A corresponding inspection method and an information processing apparatus are also provided.

Further features of the present invention will become apparent from the following description of exemplary embodiments with reference to the attached drawings.

BRIEF DESCRIPTION OF THE DRAWINGS

FIG. 7 is an explanatory diagram illustrating an example of a configuration of an inspection table according to an embodiment.

FIG. 8A is an explanatory diagram for explaining a first practical example regarding a difference between two operation modes of the portable system.

FIG. 8B is an explanatory diagram for explaining a second practical example regarding a difference between two operation modes of the portable system.

FIG. 8C is an explanatory diagram for explaining a third practical example regarding a difference between two operation modes of the portable system.

DESCRIPTION OF THE EMBODIMENTS

Figure 1:
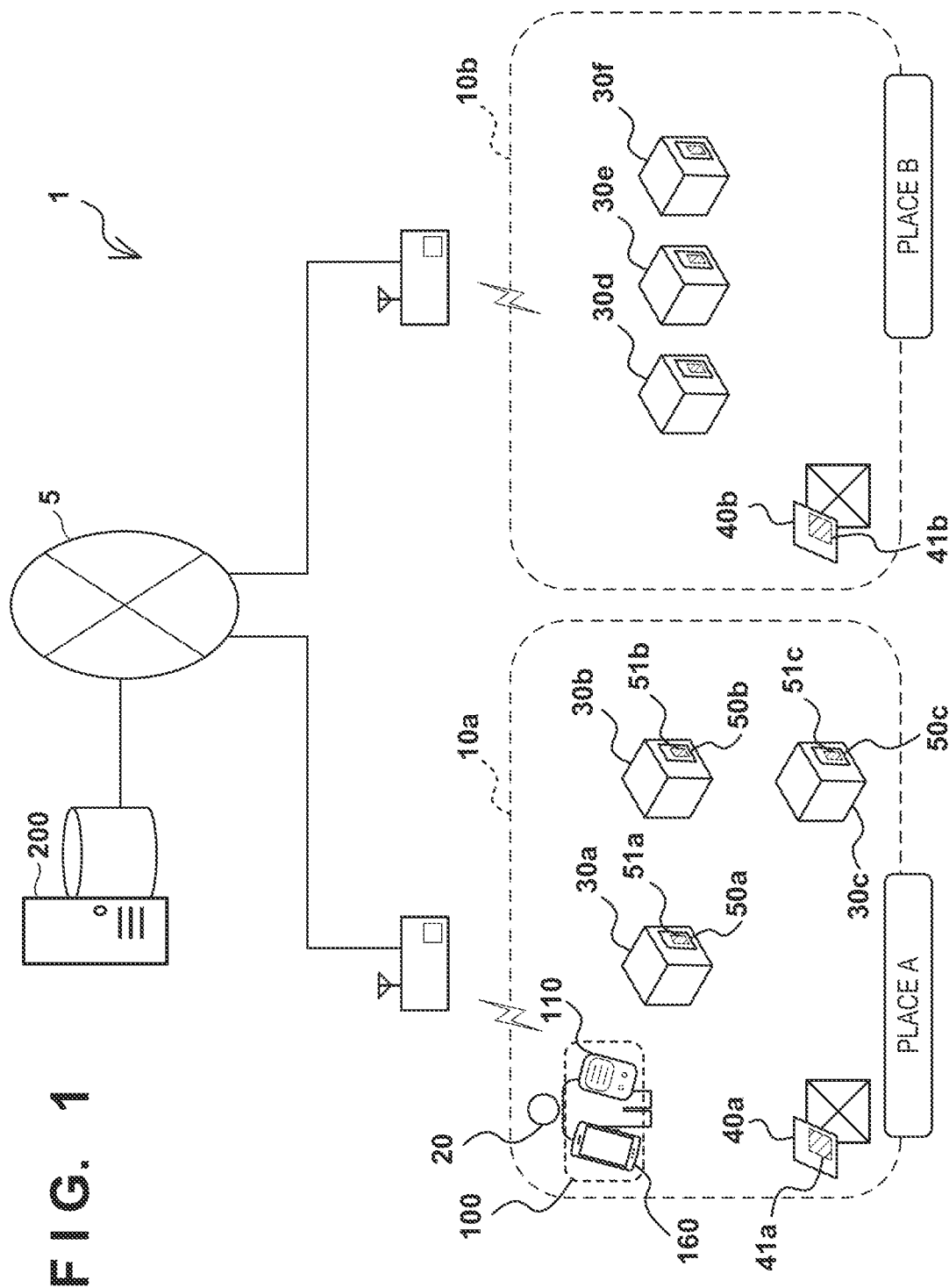
FIG. 1 is a schematic view illustrating an example of a configuration of an item inspection system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. SYSTEM OVERVIEW

FIG. 1 is a schematic view illustrating an example of a configuration of an item inspection system 1 according to an embodiment. The item inspection system 1 is a system that assists a user in inspecting locations of items. Typically, the inspection of locations of items herein refers to checking or verifying that the items are in specific places. The inspection of locations of items may be performed for various purposes such as, for example, inventory counting of stocks, confirmation of items being accepted or shipped, confirmation of placement of equipment and material at a construction site, and so on. In the present embodiment, the item inspection system 1 at least manages position information that indicates positions of the items. The position information may indicate a position of each item by two-dimensional or three-dimensional positional coordinates or by an identifier that identifies one of a plurality of predefined places as a location of the item, for example. An item may be a non-living object (for example, a machine, equipment, a tool, material, a consumable good, a component, a vehicle, or a robot) or a living object (for example, an animal or a plant). The items moves from a place to a place along with activities of users.

FIG. 1 illustrates two places 10a and 10b under management of the item inspection system 1. There are items 30a, 30b and 30c in the place 10a. There are items 30d, 30e and 30f in the place 10b. A user 20 carries a portable system 100 with him or her while moving among the places 10a and 10b (and other places). Note that, in this specification, the expression that a user carries a certain target should broadly comprehend various modes in which the user moves together with the target (for example, moves in a state where he or she holds or wears the target, etc.).

The item inspection system 1 makes use of wireless devices, which are also referred to as tags, for the purpose of item position management. Position tags are wireless devices which are installed in respective places 10a and 10b where an item may be placed in the item inspection system 1. FIG. 1 shows a position tag 40a installed in the place 10a, and a position tag 40b installed in the place 10b. The installation position of each of the position tags 40a and 40b may be fixed or can be changed. When a place itself moves, the corresponding position tag may be relocated in conjunction with the movement of the place.

Item tags are wireless devices which are attached to respective items managed in the item inspection system 1. FIG. 1 shows an item tag 50a attached to the item 30a, an item tag 50b attached to the item 30b, and an item tag 50c attached to the item 30c.

Note that, in the following descriptions, the places 10a and 10b are collectively referred to as places 10 by omitting the trailing alphabets from the reference signs when they do not need to be distinguished from each other. The same applies to the items 30 (items 30a, 30b, . . . ), the position tags 40 (position tags 40a, 40b, . . . ), and the item tags 50 (item tags 50a, 50b, . . . ), as well as any other elements. The number of places 10 and the number of items 30 managed in the item inspection system 1 are not limited to the example illustrated in FIG. 1 but may be any numbers. Likewise, the number of users 20 utilizing the item inspection system 1 is also not limited to the example illustrated in FIG. 1 but may be any number.

In the present embodiment, each of the tags such as the position tags 40 and the item tags 50 is assumed to be a passive-type RFID tag (a passive tag). A passive tag is composed of: a small integrated circuit (IC) chip with an embedded memory; and an antenna, and has identification information for identifying the tag and some other information stored in the memory. In this specification, identification information is simply referred to as an ID, and identification information for identifying a tag is referred to as a tag ID. It should be noted that the tag ID may be considered as information for identifying an object to which the tag is attached. In the example of FIG. 1, the position tags 40a and 40b have specific tag IDs 41a and 41b embedded in the tags, respectively. The item tags 50a, 50b and 50c have specific tag IDs 51a, 51b and 51c embedded in the tags, respectively. The IC chip of a passive tag operates by utilizing energy of an electromagnetic wave emitted from a tag reader, and modulates the information such as the tag ID and some other information stored in the memory into an information signal to transmit (send back) the information signal from the antenna.

It should be noted that, in another embodiment, each tag may be an active-type RFID tag. If each tag actively (for example, periodically) transmits information to its vicinity by utilizing power from a built-in battery, such a tag may be called a beacon tag. In a further embodiment, each tag may be a wireless device which sends back information in response to a signal from a reader in accordance with Near Field Communication (NFC) protocol or Bluetooth (registered trademark) protocol, for example. Each tag may have any name such as an IC tag, an IC card, or a responder.

The item inspection system 1 includes the portable system 100 and a management server 200. The portable system 100 and the management server 200 are connected to a network 5. The network 5 may be a wired network, a wireless network, or any combination thereof. Examples of the network 5 may include the Internet, an intranet, and a cloud network.

The portable system 100 includes at least a tag reader 110. The tag reader 110 is a reading apparatus that is capable of reading information stored in wireless devices such as RFID tags. The tag reader 110 can detect an item 30 to which an item tag 50 is attached by reading a tag ID 51 from the item tag 50, for example. The tag reader 110 performs reading operation periodically or in response to a certain trigger such as a user operation, and transmits a tag reading result to the management server 200. The tag reader 110 may be capable of communicating with the management server 200 directly or indirectly via a certain relay apparatus (for example, a user terminal 160 described below). An example of a particular configuration of the tag reader 110 will be further described later.

In the example illustrated in FIG. 1, the portable system 100 further includes the user terminal 160. The user terminal 160 may be any type of terminal apparatus or an information processing apparatus such as a notebook personal computer (PC), a tablet PC, a smartphone, or a smart watch, for example. The user terminal 160 may be utilized for the item inspection system 1 to interact with a user 20. An example of a particular configuration of the user terminal 160 will be further described below.

The management server 200 is an information processing apparatus that manages inspection-related statuses, position information and other information of a plurality of items 30 in a database. The management server 200 may be implemented as an application server, a database server, or a cloud server by using a high-end general-purpose computer, for example. The management server 200 receives tag reading results from the tag reader 110, and updates the database based on the received tag reading results. The management server 200 guides the user 20 to a position at which an inspection target item is assumed to exist based on a position of the portable system 100 estimated based on tag reading results (that is, a current position of the user 20) when inspection of a location of the item is carried out. An example of a particular configuration of the management server 200 will be further described below.

Though a single management server 200 is illustrated in FIG. 1, the functions of the management server 200, which will be described in detail below, may be provided by a single apparatus or by physically-separate multiple apparatuses which operate in conjunction with each other. In addition, though an example where the management server 200 maintains a database will be described in the present embodiment, an apparatus other than the management server 200 may maintain a part or all of the database. For example, a part of data may be maintained by a wireless device (for example, a position tag or an item tag), the tag reader 110 or the user terminal 160.

Note that FIG. 1 shows an example where the portable system 100 includes separate apparatuses, namely the tag reader 110 and the user terminal 160. However, the portable system 100 is not limited to this example. For instance, the tag reader 110 may have a part or all of the functions of the user terminal 160 described below, or the user terminal 160 may have a part or all of the functions of the tag reader 110 described below. Moreover, the functions of the management server 200 described in the present embodiment may be realized within the user terminal 160.

2. CONFIGURATION EXAMPLE OF PORTABLE SYSTEM

2-1. Configuration Example of Tag Reader

Figure 2:
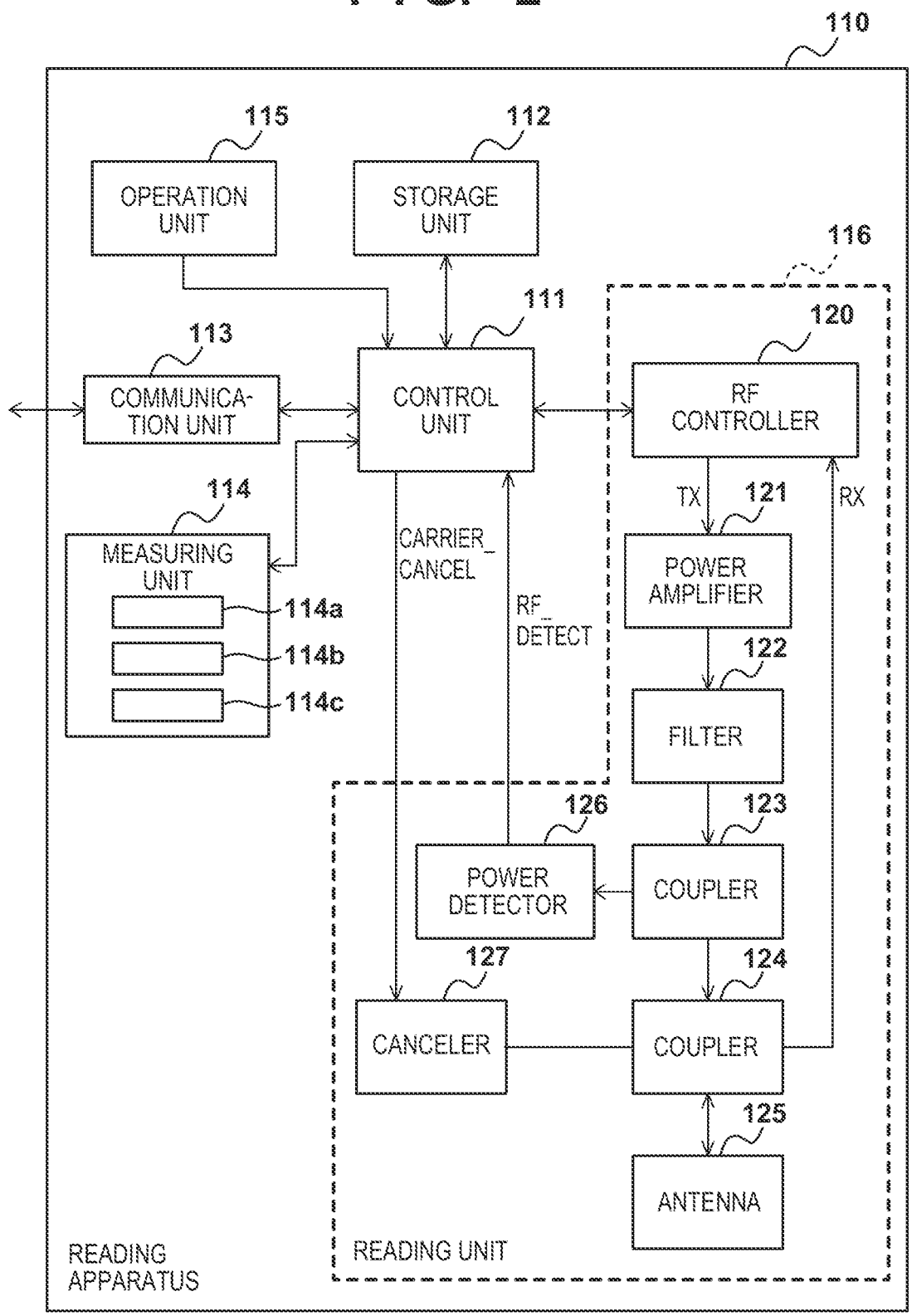
FIG. 2 is a block diagram illustrating an example of a configuration of a tag reader included in a portable system according to an embodiment.

FIG. 2 is a block diagram illustrating an example of a configuration of the tag reader 110 included in the portable system 100 according to an embodiment. With reference to FIG. 2, the tag reader 110 comprises a control unit 111, a storage unit 112, a communication unit 113, a measuring unit 114, an operation unit 115, and a reading unit 116.

The control unit 111 consists of a memory to store computer programs, and one or more processors (for example, central processing units (CPUs)) to execute the computer programs. The control unit 111 controls overall functionality of the tag reader 110 described in this specification. For example, the control unit 111 causes the reading unit 116 to perform reading from an RFID tag within a tag reading range, and causes the storage unit 112 to temporarily store the read information, the time of the reading and the reception level as reading result data. In parallel to the reading from RFID tags, the control unit 111 also causes the measuring unit 114 to measure the position of the tag reader 110, and the storage unit 112 to store a measurement result. Then, the control unit 111 transmits, to the management server 200 via the communication unit 113, the reading result data and the measurement result data stored in the storage unit 112 together with the reader identification information (also referred to as a reader ID) of the tag reader 100.

The storage unit 112 may include any kind of storage medium such as a semiconductor memory (a read only memory (ROM), a random access memory (RAM), or the like), an optical disk, or a magnetic disk, for example. In the present embodiment, the storage unit 112 stores the above-described reading result data, measurement result data, and the reader ID of the tag reader 110.

The communication unit 113 is a communication interface for the tag reader 110 to communicate with the management server 200. For example, the communication unit 113 may be a wireless local area network (WLAN) interface that communicates with a WLAN access point, or a cellular communication interface that communicates with a cellular base station. Alternatively, the communication unit 113 may be a connection interface (e.g. a Bluetooth (registered trademark) interface or a universal serial bus (USB) interface) for connection with a relay apparatus.

The measuring unit 114 is a unit that is capable of measuring a position of the tag reader 110. In the present embodiment, the measuring unit 114 uses the self-localization technique, also referred to as pedestrian dead reckoning (PDR) to measure an amount of relative movement of the tag reader 110 from a certain reference position, and outputs the measured amount of movement to the control unit 111. The reference position of measurement of the amount of relative movement may be, for example, the position of the tag reader 110 at the time of being activated. The amount of relative movement of the tag reader 110 may be treated as a relative position. For example, the measuring unit 114 includes three-axis acceleration sensor 114a, gyro sensor 114b, and geomagnetic sensor 114c. The three-axis acceleration sensor 114a measures acceleration applied to the tag reader 110 in the device coordinate system that is specific to the tag reader 110, and outputs first sensor data. The gyro sensor 114b measures an angular speed of the tag reader 110, that is a change in attitude of the tag reader 110, and outputs second sensor data. The geomagnetic sensor 114c measures an orientation of the tag reader 110 in the real space, and outputs third sensor data. The measuring unit 114 can measure the amount of relative movement of the tag reader 110 based on these pieces of sensor data by converting the direction of the acceleration of the tag reader 110 into a direction in a coordinate system of the real space to integrate the converted acceleration. The amount of relative movement of the tag reader 110 output from the measuring unit 114 to the control unit 111 may be a two-dimensional vector in a horizontal plane or a three-dimensional vector that includes a component of height direction as well.

As described below, in the present embodiment, the positional coordinates of the installation position of each position tag 40 are known and registered in a database. Therefore, the current (positional coordinates of) absolute position of the tag reader 110 can be estimated based on the amount of relative movement of the tag reader 110 from the time point where it detected a position tag 40 to the current time point, and the known positional coordinates of that position tag 40. In the present embodiment, an example where the management server 200 estimates an absolute position of the tag reader 110 is mainly described, however, the control unit 111 or the measuring unit 114 of the tag reader 110 may access the database to estimate the absolute position of the tag reader 110. In another embodiment, the measuring unit 114 may measure the current geographical position of the tag reader 110 by utilizing the global positioning system (GPS). In yet another embodiment, the measuring unit 114 may perform base station positioning or wireless LAN positioning in which the current position is estimated by utilizing known positional coordinates of a base station or a wireless LAN access point to which the apparatus is connected.

Note that the portable system 100 may include a measuring apparatus (which is capable of measuring an amount of relative movement using the self-localization technique, for example) separately from the tag reader 110, instead of the tag reader 110 including the measuring unit 114.

The operation unit 115 receives an operation by the user 20. The operation unit 115 includes physical input devices such as a button, a switch, or a lever disposed on a housing of the tag reader 110, for example. The operation unit 115 receives an operation by the user 20 through an input device, and outputs an operation signal to the control unit 111. In addition, the operation unit 115 may include an audio input interface such as a microphone.

The reading unit 116 is a unit that is capable of reading, from each of the position tags 40 and the item tags 50 under management of the item inspection system 1, information stored in that tag. With reference to FIG. 2, the reading unit 116 includes an RF controller 120, a power amplifier 121, a filter 122, a first coupler 123, a second coupler 124, an antenna 125, a power detector 126, and a canceler 127. The RF controller 120 outputs a transmission signal (for example, a signal modulated in the UHF band) from a TX terminal to the power amplifier 121 in accordance with control by the control unit 111. The power amplifier 121 amplifies the transmission signal input from the RF controller 120 to output it to the filter 122. The amplification rate of the transmission signal here may be controllable in variable manner, and a higher amplification rate will enhance an output strength of an electromagnetic wave emitted from the tag reader 110. The filter 122 may be a low-pass filter, for example, and filters out unnecessary frequency components from the transmission signal amplified by the power amplifier 121. The first coupler 123 distributes the transmission signal that has passed the filter 122 to the coupler 124 and the power detector 126. The second coupler 124 outputs the transmission signal input from the first coupler 123 to the antenna 125, and outputs a received signal input from the antenna 125 to the RF controller 120. The antenna 125 transmits the transmission signal input from the coupler 124 to the air as an electromagnetic wave. Further, the antenna 125 receives a signal that has been sent back from an RFID tag that exists within the reading range of the tag reader 110 in response to the transmission signal, and outputs the received signal to the coupler 124. As an example, the antenna 125 may be an omnidirectional antenna. As another example, the antenna 125 may be a directional antenna of which beam direction can be variably controlled. The power detector 126 detects a power level of the signal input from the first coupler 123, and outputs a signal 'RF_DETECT' indicative of the detected power level to the control unit 111. The canceler 127 receives a signal 'CARRIER_CANCEL' indicative of a power level of a carrier from the control unit 111. Then, the canceler 127 extracts an intended signal component of the received signal to be output to an RX terminal of the RF controller 120 by canceling the carrier component of the transmission signal based on the CARRIER_CANCEL. The RF controller 120 demodulates the signal input from the RX terminal to obtain a tag ID and other information sent back from the RFID tag, and outputs the obtained information to the control unit 111. The RF controller 120 also measures a reception level (also referred to as received strength) of the signal input from the RX terminal, and outputs the measurement result to the control unit 111.

As described in detail below, the portable system 100 is capable of selectively operating one of a plurality of operation modes. In a practical example, the control unit 111 may set characteristics of operation of the reading unit 116 (for example, output strength or directionality) such that the reading range for RFID tags is different per operation mode. In another example, the control unit 111 may set different condition (for example, minimum reception level or detection duration) per operation mode as a condition to determine that the tag reader 110 has detected an RFID tag (hereinafter, referred to as detection condition). When a received signal from an RFID tag satisfies the set detection condition, the control unit 111 may determine to have detected the RFID tag, and transmit a corresponding reading result data to the management server 200. Alternatively, the determination of whether a received signal from an RFID tag satisfies the set detection condition may be performed at the management server 200 which receives the reading result data. As yet another practical example, the control unit 111 may set the same reading range and detection condition to the reading unit 116 irrespective of a selected operation mode. The switching between the operation modes may be instructed by the user 20 via the operation unit 115 of the tag reader 110 or an operation unit 165 of the user terminal 160 described below. Respective roles of the operation modes will be further described below.

In the present embodiment, the reading unit 116 can attempt tag reading periodically (for example, once per second) without requiring any explicit command from a user. Data transmission from the communication unit 113 to the management server 200 can also be performed periodically (for example, every few seconds) or whenever the tag reading is done without requiring any explicit command from a user. The control unit 111 may exclude, from the data to be transmitted, the same record as the most recent record that has already been transmitted in a predetermined time period to omit redundant data transmission and reduce a communication load. Noted that, in another embodiment, one or both of an attempt of tag reading by the reading unit 116 and data transmission to the management server 200 may be performed in response to detecting a user input via the operation unit 115. In a case where the communication unit 113 performs communication with the management server 200 indirectly via a relay apparatus, the data transmission to the management server 200 may be performed only while there is an effective connection between the communication unit 113 and the relay apparatus.

2-2. Configuration Example of User Terminal

Figure 3:
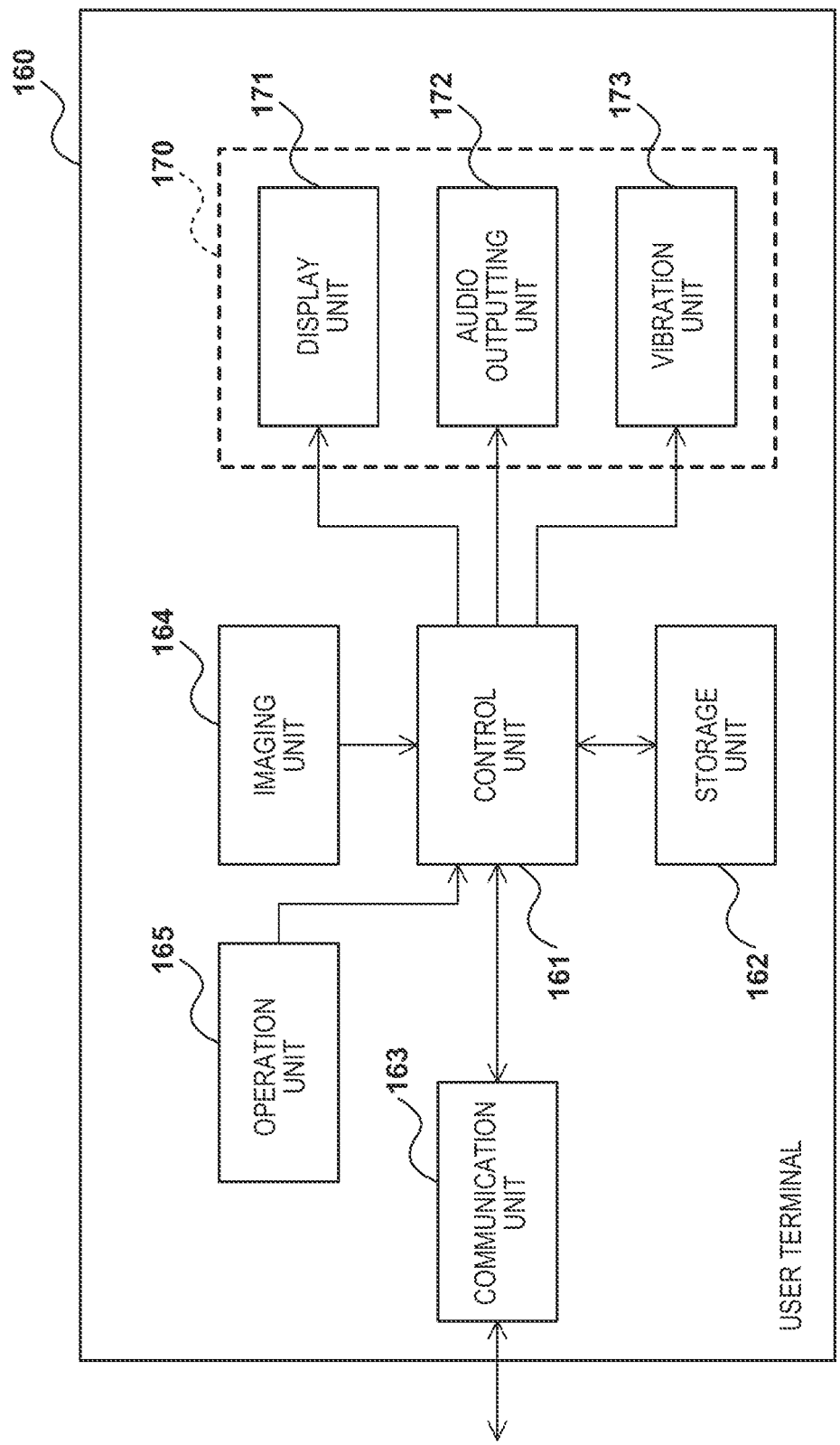
FIG. 3 is a block diagram illustrating an example of a configuration of a user terminal included in the portable system according to an embodiment.

FIG. 3 is a block diagram illustrating an example of a configuration of the user terminal 160 included in the portable system 100 according to an embodiment. With reference to FIG. 3, the user terminal 160 comprises a control unit 161, a storage unit 162, a communication unit 163, an imaging unit 164, an operation unit 165, a display unit 171, an audio outputting unit 172 and a vibration unit 173.

The control unit 161 consists of a memory to store computer programs, and one or more processors to execute the computer programs. The processor may be a CPU, or an integrated circuit (IC) such as a microcontroller (for example, one-chip microcontroller). The control unit 161 may include a timer circuit or a software timer for measuring time. The control unit 161 controls overall functionality of the user terminal 160 described in this specification. For example, when location inspection of the items 30 is carried out in the item inspection system 1, the control unit 161 causes the display unit 171 to display a screen on which the current position of the portable system 100 and positions of items which exist in the vicinity are displayed. As a location of a target item to be inspected is displayed on this screen, the user 20 is guided to the position of the target item. Some examples of screens for guiding the user 20 to a position of a target item will further be described below.

The storage unit 162 may include any kind of storage medium such as a semiconductor memory (e.g. ROM, RAM, or the like), an optical disk, or a magnetic disk, for example. In the present embodiment, the storage unit 162 temporarily stores a map image and position information (of the portable system 100 and items 30) received from the management server 200 described below for the purpose of screen display, for example.

The communication unit 163 is a communication interface for the user terminal 160 to communicate with the management server 200. For example, the communication unit 163 may be a WLAN interface or a cellular communication interface. The user terminal 160 may further comprise a connection interface (e.g. a Bluetooth (registered trademark) interface or a universal serial bus (USB) interface) for connection with peripheral equipment though it is not shown in FIG. 3.

The imaging unit 164 is a so-called camera unit that images a scene of a real space to generate image data of a still image or a moving image. The imaging unit 164 outputs the generated image data to the control unit 161. For example, the image data generated by the imaging unit 164 may be utilized for optical character recognition (OCR) or reading a visible code such as a bar code or a QR code (registered trademark).

The operation unit 165 receives operations or information inputs from the user 20. The operation unit 165 includes input devices such as a touch sensor, a key pad, a keyboard, a button, or a pointing device, for example. The operation unit 165 receives an operation by the user 20 through an input device, and outputs an operation signal to the control unit 161. In addition, the operation unit 165 may further include some other types of input devices including an audio input interface such as a microphone, a sensor to detect a vibration, or the like.

The display unit 171 displays an image and information. The display unit 171 may be a liquid crystal display (LCD) or an organic light emitting diode (OLED), for example. The audio outputting unit 172 outputs audio. The audio outputting unit 172 may be a speaker, for example. The vibration unit 173 vibrates the user terminal 160. The vibration unit 173 may be a vibrator including an eccentric motor, for example. One or more of the display unit 171, the audio outputting unit 172 and the vibration unit 173 may function as a notification unit 170 that performs notification to the user 20. Note that a notification function that is similar to the above-described notification unit 170 may be arranged in the tag reader 110 though it is not illustrated in FIG. 2.

3. CONFIGURATION EXAMPLE OF MANAGEMENT SERVER 3-1. Basic Configuration

Figure 4:
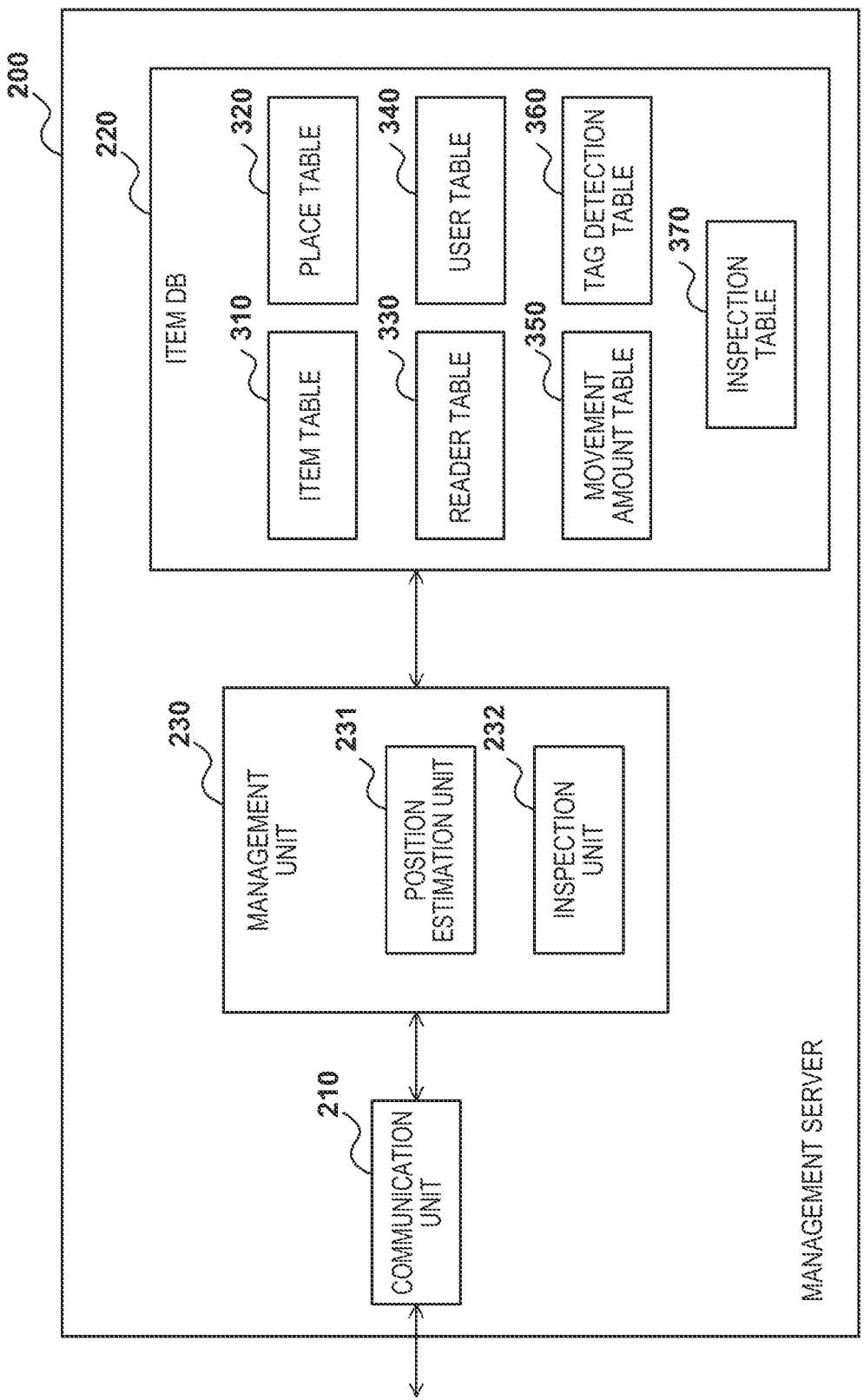
FIG. 4 is a block diagram illustrating an example of a configuration of a management server according to an embodiment.

FIG. 4 is a block diagram illustrating an example of a configuration of the management server 200 according to an embodiment. With reference to FIG. 4, the management server 200 comprises a communication unit 210, an item database (DB) 220, and a management unit 230.

The communication unit 210 is a communication interface for the management server 200 to communicate with other apparatuses. The communication unit 210 may be a wired communication interface or a wireless communication interface. In the present embodiment, the communication unit 210 communicates with the portable system 100 (for example, one or both of the tag reader 110 and the user terminal 160). The item DB 220 is a database that stores inspection-related statuses of a plurality of items under management of the system, position information and other information. In the present embodiment, the item DB 220 includes an item table 310, a place table 320, a reader table 330, a user table 340, a movement amount table 350, a tag detection table 360, and an inspection table 370. The management unit 230 is a set of software modules that provide management functions for managing data within the item DB 220. The individual software modules can run by one or more processors (not shown) of the management server 200 executing computer programs stored in a memory (not shown). In the present embodiment, the management unit 230 includes a position estimation unit 231 and an inspection unit 232.

3-2. Data Configuration Examples

Figure 5A:
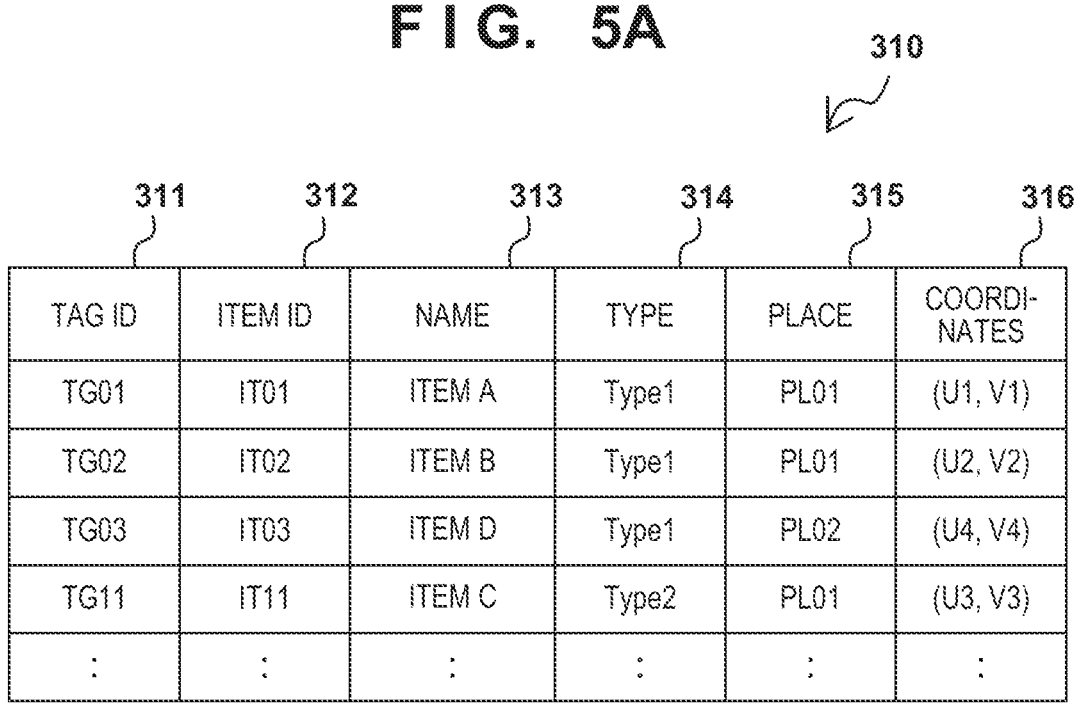
FIG. 5A is an explanatory diagram illustrating an example of a configuration of an item table according to an embodiment.
Figure 5B:
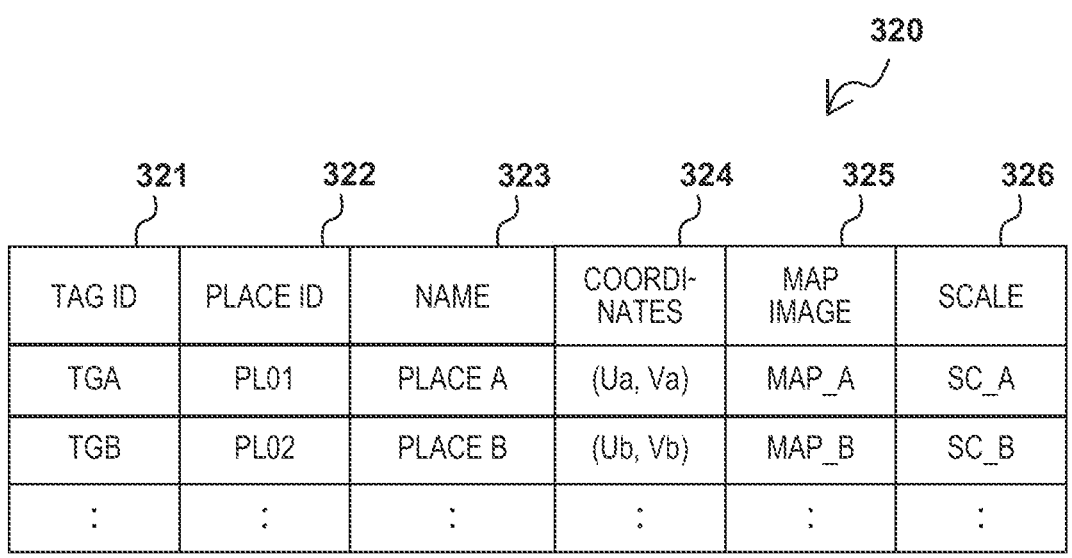
FIG. 5B is an explanatory diagram illustrating an example of a configuration of a place table according to an embodiment.
Figure 5C:
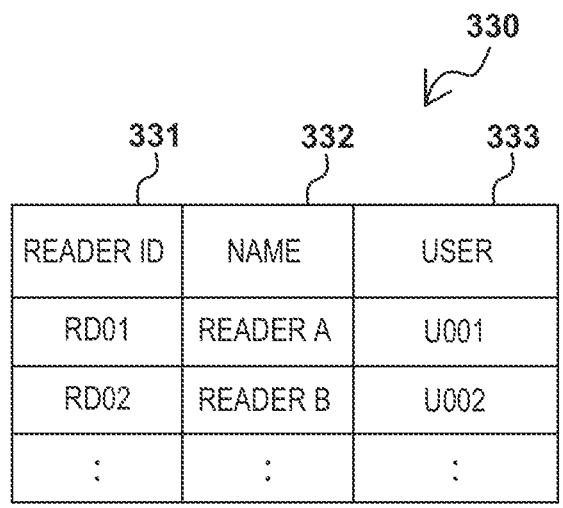
FIG. 5C is an explanatory diagram illustrating an example of a configuration of a reader table according to an embodiment.
Figure 5D:
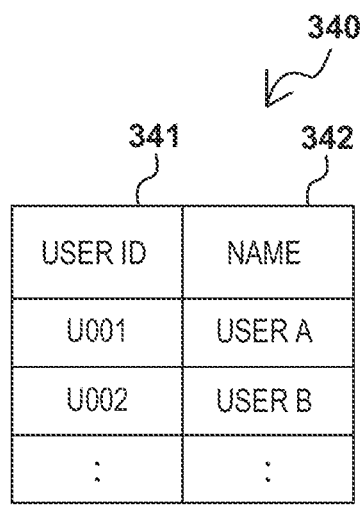
FIG. 5D is an explanatory diagram illustrating an example of a configuration of a user table according to an embodiment.
Figure 6A:
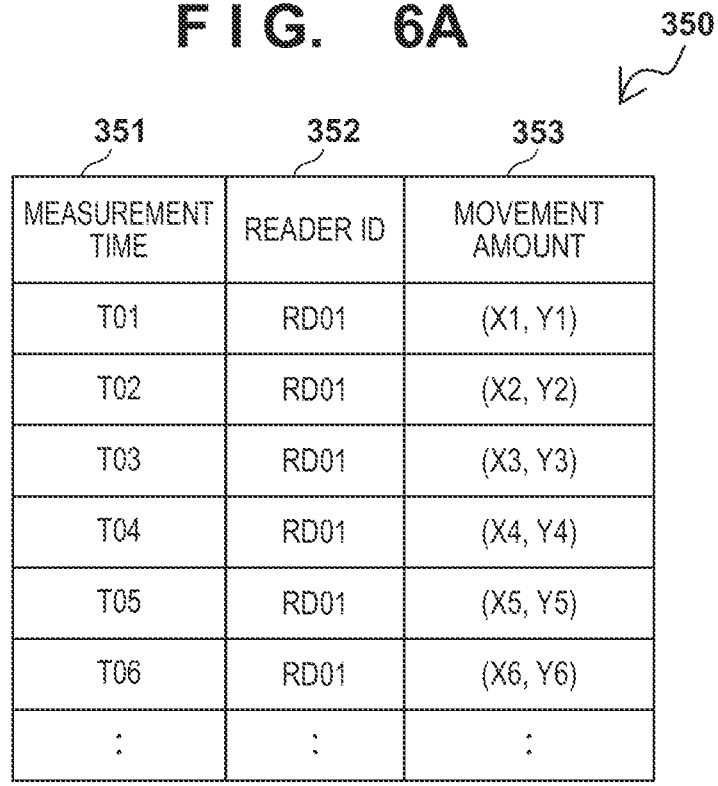
FIG. 6A is an explanatory diagram illustrating an example of a configuration of a movement amount table according to an embodiment.
Figure 6B:
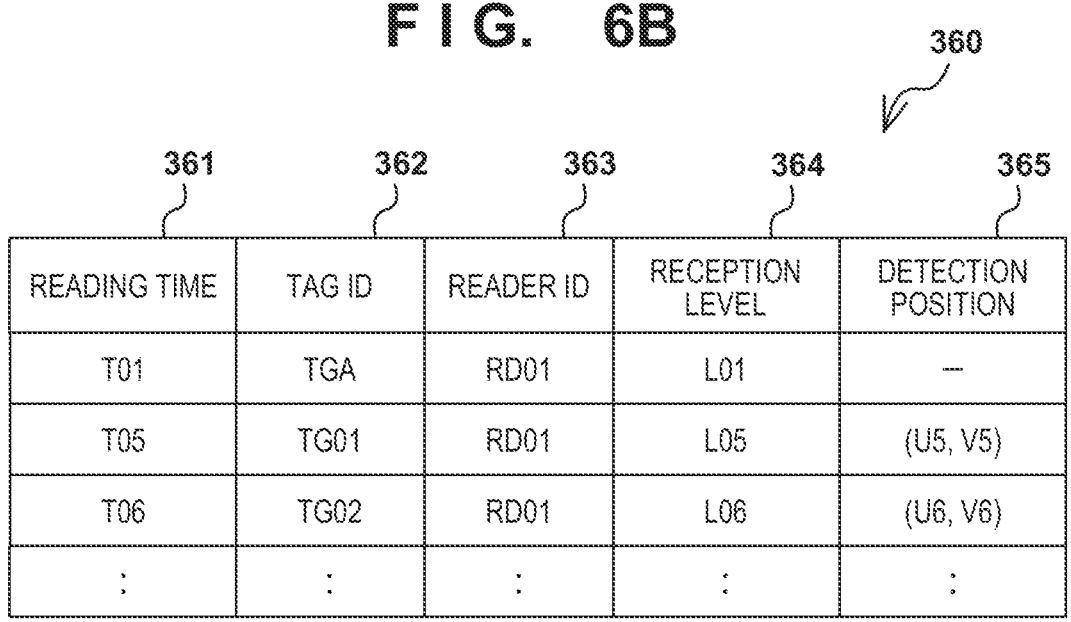
FIG. 6B is an explanatory diagram illustrating an example of a configuration of a tag detection table according to an embodiment.

FIGS. 5A to 5D illustrate respective configuration examples of the item table 310, the place table 320, the reader table 330, and the user table 340 of the item DB 220. FIGS. 6A and 6B illustrate respective configuration examples of the movement amount table 350 and the tag detection table 360 of the item DB 220. FIG. 7 illustrates a configuration example of the inspection table 370.

The item table 310 has six data elements, namely Tag ID 311, Item ID 312, Name 313, Type 314, Place 315, and Coordinates 316. Tag ID 311 is identification information that uniquely identifies an item tag 50 attached to each of the items 30 under management of the system. The value of Tag ID 311 is the same as the value of the tag ID stored within the corresponding item tag 50. Item ID 312 is identification information that uniquely identifies each item 30. Name 313 represents a name of each item 30. In the example of FIG. 5A, the items identified by item IDs "IT01", "IT02", "IT03" and "IT11" are given the names of "Item A", "Item B", "Item D" and "Item C", respectively. "Item A", "Item B", "Item D" and "Item C" here may correspond respectively to the items 30a, 30b, 30d and 30c illustrated in FIG. 1. Type 314 represents a type into which each item 30 is classified. In the example of FIG. 5A, the type of "Item A", Item B" and "Item D" is "Type 1", and the type of "Item C" is "Type 2". The values of Name 313 and Type 314 of each item 30 are determined by a user, and may be registered in advance via a user interface provided by the management unit 230. Alternatively, the values of Name 313 and Type 314 may be stored in item tags 50 as item-related information and read by a tag reader 110. In the latter case, upon initial tag reading from the item tag 50 of each item 30, the management server 200 may receive the values of Name 313 and Type 314 of that item 30 from the tag reader 110, and register them in the item table 310. Place 315 represents a place where each item 30 has been last detected by a tag reader 110 with a place ID which identifies that place. In the example of FIG. 5A, "Item A", "Item B" and "Item C" exist in the place identified by the place ID "PL01". "Item D" exists in the place identified by the place ID "PL02". Coordinates 316 represents positional coordinates of a point at which each item is estimated to be positioned. The values of Place 315 and Coordinates 316 may be updated by the position estimation unit 231 when the tag reader 110 has detected a movement of an item as will be described below.

The place table 320 has six data elements, namely Tag ID 321, Place ID 322, Name 323, Coordinates 324, Map Image 325, and Scale 326. Tag ID 321 is identification information that uniquely identifies a position tag 40 installed in each of the places 10 under management of the system. The value of Tag ID 321 is the same as the value of the tag ID stored within the corresponding position tag 40. Place ID 322 is identification information that uniquely identifies each place 10. Name 323 represents a name of each place 10. In the example of FIG. 5B, the name of the place 10 identified by the place ID "PL01" is "Place A", and the name of the place 10 identified by the place ID "PL02" is 'Place B". Noted that these names may be, in practice, such as "Factory", "Warehouse" and "Work Site", for example. Coordinates 324 represents positional coordinates of an installation position of a position tag 40 installed in each place 10. Map Image 325 is a data element in which map image data of each place 10 is stored. Scale 326 indicates a ratio for converting a distance on the map of Map Image 325 into a distance in the real space (for example, how many meters in the real space one pixel of the image corresponds to). Note that the map image data stored in Map Image 325 may be updated with one obtained from an external data source or uploaded by a user at necessary timings.

The reader table 330 has three data elements, namely Reader ID 331, Name 332, and User 333. Reader ID 331 is identification information that uniquely identifies each of the tag readers 110 utilized in the system. Name 332 represents a name of each reader. In the example of FIG. 5C, the name of the tag reader 110 identified by the reader ID "RD01" is "Reader A", and the name of the tag reader 110 identified by the reader ID "RD02" is "Reader B". User 333 identifies a user 20 who uses each tag reader 110 with a value of User ID 341 of the user table 340.

The user table 340 has two data elements, namely User ID 341 and Name 342. User ID 341 is identification information that uniquely identifies each of the users 20 who utilize the item inspection system 1. Name 342 represents a name of each user. In the example of FIG. 5D, the name of the user 20 identified by the user ID "U001" is "User A", and the name of the user 20 identified by the user ID "U002" is "User B". Though not illustrated in FIG. 5D, the user table 340 may further include authentication information that each user 20 utilizes when logging in to the system (for example, passwords).

The movement amount table 350 is a table for accumulating records of measurement result data received from tag reader 110 (hereinafter referred to as measurement result records). The movement amount table 350 has three data elements, namely, Measurement Time 351, Reader ID 352, and Movement Amount 353. Measurement Time 351 indicates a time at which measurement was performed for the measurement result indicated by each measurement result record. Reader ID 352 is identification information that identifies a tag reader 110 that has performed the measurement for the measurement result indicated by each measurement result record. In the example of FIG. 6A, six records in the movement amount table 350 indicate the results of measurements of amounts of movement that have been performed by the tag reader 110, which is identified by Reader ID "RD01", at six different times "T01" to "T06". Movement Amount 353 represents an amount of relative movement as a measurement result. Herein, Movement Amount 353 represents the amount of relative movement in the form of a two-dimensional vector in a real-space coordinate system.

The tag detection table 360 is a table for accumulating records of reading result data received from the tag readers 110 (hereinafter referred to as reading result records). The tag detection table 360 has five data elements, namely, Reading Time 361, Tag ID 362, Reader ID 363, Reception Level 364, and Detection Position 365. Reading Time 361 represents a time at which a tag ID has been read for each reading result record. Tag ID 362 represents the tag ID that has been read for each reading result record. Reader ID 363 is identification information that identifies the tag reader 110 that has performed tag reading for each reading result record. In the example of FIG. 6B, the first record in the tag detection table 360 indicates that the tag reader 110 identified by the reader ID "RD01" has read the tag ID "TGA" (for example, the tag ID 41a of the position tag 40a in the place 10a) at time "T01". The second record indicates that the tag reader 110 has read the tag ID "TG01" (for example, the tag ID 51a of the item tag 50a of item 30a) at time "T05". The third record indicates that the tag reader 110a has read the tag ID "TG02" (for example, the tag ID 51b of the item tag 50b of item 30b) at time "T06". Reception Level 364 represents a reception level of a signal received by the tag reader 110 at the time of tag reading for each reading result record. Detection Position 365 represents positional coordinates of a point at which the tag reader 110 has existed at the time of tag reading from the item tag 50 (that is, the detection position of an item tag 50 and a corresponding item 30).

The inspection table 370 is a table for storing a status regarding inspection and related information of each of target items of which locations should be inspected. The inspection table 370 has six data elements, namely Target Item 371, Inspection Deadline 372, Status 373, Completion Date & Time 374, Place 375, and Coordinates 376. Target Item 371 identifies a target item of inspection with a value of Item ID 312 of the item table 310. Inspection Deadline 372 represents a deadline by which the inspection should be completed for each target item. As understood from the example of FIG. 7, the inspection may be performed a plurality of times with different deadlines for the same target item. For example, in a case where inventory counting is carried out once a half year, a record for the inspection (hereinafter, referred to as an inspection record) for each item 30 may be added to the inspection table 370 once a half year. That is, each inspection record may be uniquely identified by a combination of Target Item 371 and Inspection Deadline 372. Status 373 is a flag that represents whether the inspection has been completed or not for each inspection record. Status 373 has a value of "Completed" or "Uncompleted", for example. Completion Date & Time 374 represents a date and time of completion of the inspection for an inspection record of which inspection has been completed. Place 375 identifies a place 10 where the target item has been detected with a value of Place ID 322 of the place table 320 for an inspection record of which inspection has been completed. Coordinates 376 represents an estimated position of the target item at the time of completing the inspection for an inspection record of which inspection has been completed. For inspection records of uncompleted inspection, the fields of Completion Date & Time 374, Place 375, and Coordinates 376 may be blank.

3-3. Estimation of Position

The position estimation unit 231 is configured to estimate a position of the portable system 100 based on results of reading of tag IDs from the position tags 40 by the tag reader 110. For example, the position estimation unit 231 estimates a current position of the portable system 100 based on the amount of relative movement of the portable system 100 from a point in time at which the tag reader 110 has read a tag ID from a position tag 40 and the known position of the position tag 40. In addition, in response to a tag ID having been read from an item tag 50 by the tag reader 110, the position estimation unit 231 updates a position indicated by the position information of the item 30 to which that item tag 50 is attached based on the current position estimated for the portable system 100. The position information of the item 30 herein may include Place 315 and Coordinates 316 of the item table 310, for example.

More specifically, the position estimation unit 231 adds, to the movement amount table 350, each record of the measurement result data received from the portable system 100 via the communication unit 210 as a measurement result record. In addition, the position estimation unit 231 adds, to the tag detection table 360, each record of the reading result data received from the portable system 100 via the communication unit 210 as a reading result record. In a case where an item tag 50 has been detected by the tag reader 110, the position estimation unit 231 derives positional coordinates of the item tag 50 based on the amount of relative movement of the tag reader 110 from a detection position of a position tag 40 within the same place 10 and the known positional coordinates of that position tag 40. For example, the amount of relative movement of the tag reader 110 at the time when an item tag 50 has been detected is denoted by (X, Y). Positional coordinates of a most-recently detected position tag 40 is denoted by $(U_0, V_0)$, and the amount of relative movement of the tag reader 110 at the time when the position tag 40 has been detected is denoted by $(X_0, Y_0)$. Then, the positional coordinates (U, V) of the item tag 50 can be derived according to the following formula (1):

$$(U,V)=(U_0+(X-X_0),V_0+(Y-Y_0)) \quad (1)$$

The position estimation unit 231 adds the positional coordinates of the item tag 50 that may be derived using the formula (1) to the field of Detection Position 365 of the tag detection table 360.

The position estimation unit 231 may estimate that the item 30 to which the item tag 50 is attached is located at the detection position of the item tag 50 derived using the formula (1). In addition, in a case where the same item tag 50 has been detected multiple times within a certain period, the position estimation unit 231 may estimate that the corresponding item 30 is located at the detection position of the item tag 50 derived based on the amount of relative movement of the tag reader 110 at the time when the reception level of the signal is the highest. Alternatively, in a case where the same item tag 50 has been detected multiple times within a certain period, the position estimation unit 231 may estimate that the corresponding item 30 is located at the center (for example, the position of the gravity center) of the multiple detection positions of the item tag 50 derived using the formula (1). The position estimation unit 231 updates the field of Coordinates 316 of the corresponding record of the item table 310 with the positional coordinates that indicate the latest estimated position of the item 30. The position estimation unit 231 also updates the field of Place 315 of the record of the corresponding item 30 of the item table 310 in a case where the place 10 in which the item 30 exists has changed.

3-4. Inspection on Locations of Items

In various situations such as inventory and distribution management, humans are sometimes required to confirm and record that an item exists in a specific location. If the number of target items is large or the confirmation work is frequently required, the burden of the work to visually check every target item and record its result is huge. To mitigate such a burden, the item inspection system 1 treats a result of reading that the tag reader 110 carried by the user 20 has detected the tag ID from the item tag 50 as a basis to determine that the location of the item 30 has been substantially confirmed by the user 20. That is, the inspection unit 232 of the management server 200 cooperates with the portable system 100 carried by the user 20 to perform location inspection on an item 30 to which an item tag 50 is attached based on a result of reading of a tag ID from the item tag 50 by the tag reader 110.

Taking inventory counting as an example, the inspection unit 232 extracts item IDs of items 30 that are subject to the inventory counting from the item table 310 on a regular basis, and adds an inspection record indicating a combination of each of the extracted item IDs and the work deadline to the inspection table 370. The statuses of the inspection records added herein are set to "Uncompleted". Then, in response to a tag ID having been read from an item tag 50 of a target item by the tag reader 110 (the target item having been detected by the tag reader 110) under a certain condition, it is determined that the target item is in the same place as the current position of the tag reader 110. Then, the inspection unit 232 updates the status of the inspection record of the target item to "Completed" which is a value indicating the inspection completed.

3-4-1. Two Operation Modes

In the present embodiment, the portable system 100 is capable of selectively operating one of a plurality of operation modes as described above. One of the plurality of operation modes is an operation mode for estimating a position of the portable system 100, which is referred to as 'search mode' in the following descriptions. The search mode may be a default operation mode selected by the portable system 100 in normal times. During the search mode, the tag reader 110 periodically attempts to read a tag without any explicit instruction by the user, for example. When the user 20 visits a certain place 10 and the tag reader 110 has detected a position tag 40 within its reading range, the current position of the tag reader 110 (and the user 20) is estimated by the position estimation unit 231. The inspection unit 232 specifies, in the inspection table 370, one or more item IDs of items 30 of which Status 373 indicates "Uncompleted" (that is, target items) that exist around the estimated current position of the tag reader 110. The inspection unit 232 obtains position information of the specified one or more target items from the item table 310. Then, the inspection unit 232 guides the user 20 to the position at which each target item is expected to exist for inspection based on the position of the target item indicated by the obtained position information and the current position of the portable system 100.

Another one of the plurality of operation modes is an operation mode for inspection on items 30, which is referred to as 'inspection mode' in the following descriptions. In the present embodiment, the inspection mode may be an operation mode that is selected by the portable system 100 when a transition from the search mode to the inspection mode is instructed by the user 20 (or automatically when a certain condition is satisfied). During the inspection mode as well, the tag reader 110 periodically attempts to read a tag. When the user 20 is guided and approaches a position at which a target item is assumed to exist, the tag reader 110 detects the item tag 50 of the target item that has entered the reading range. In response to the tag reader 110 reading the tag ID from the item tag 50 of the target item while the portable system 100 is operating in the inspection mode, the portable system 100 performs notification to the user 20 with a predetermined notification pattern. The predetermined notification pattern may be any pattern for making the user 20 aware that the inspection target item has been detected. For example, in the notification unit 170 of the user terminal 160, the display unit 171 may display a predetermined message, icon, item image or name of the item, the audio outputting unit 172 may output a predetermined sound or speech, or the vibration unit 173 may vibrate. Alternatively, in the tag reader 110, a light-emitting diode (LED) may emit a light, a speaker may output a notification sound, or a vibrator may vibrate.

When a target item has been detected by the tag reader 110 while the portable system 100 is operating in the inspection mode, the inspection unit 232 may determine that the target item is located in the same place as the current position of the portable system 100 and automatically update the status of the target item. This is referred to as an automatic update approach. Alternatively, when a target item has been detected by the tag reader 110 and a predetermined user operation to the portable system 100 has been detected, the inspection unit 232 may update the status of the target item in the inspection table 370. This is referred to as a user-confirmed update approach. The predetermined user operation herein may include a physical UI operation on, an operation to GUI on a screen of, a speech input to, or an operation of shaking the main body of the user terminal 160 (or the tag reader 110). The predetermined user operation may also include capturing an image of the target item, or reading a string or visible code printed or affixed on a surface of the target item by the imaging unit 164 of the user terminal 160.

In the following, three practical examples regarding differences between the search mode and the inspection mode will be described using FIGS. 8A to 8C.

(1) First Practical Example

According to a first practical example, the reading range of the tag reader 110 in the inspection mode is narrower than the reading range of the tag reader 110 in the search mode. For example, the control unit 111 of the tag reader 110 set the output strength of the reading unit 116 in the inspection mode to be lower compared to that in the search mode, or set the directionality of the reading unit 116 to be omnidirectional in the search mode and to a specific direction in the inspection mode.

FIG. 8A is an explanatory diagram for explaining the first practical example. FIG. 8A shows, on the left-hand side, a situation where a user 20 carries the portable system 100 and visits the place 10a. At the beginning of the visit, the operation mode of the portable system 100 is the search mode, and the reading range of the tag reader 110 is set to a relatively-broad range $R_1$. With this broad range $R_1$, the tag reader 110 easily captures the position tag 40a needed for estimation of the current position. Once the position tag 40a is detected by the tag reader 110, the inspection unit 232 becomes aware that the tag reader 110 exists in the place 10a. There are the items 30a and 30b in the place 10a, and the item 30a is an inspection target item, for example. The position estimation unit 231 starts tracking the current position of the tag reader 110 using the self-localization technique with respect to the known position of the position tag 40*a*. In the figure, the tag reader 110 is moving along the arrow $A_1$ together with the user 20.

FIG. 8A shows, on the right-hand side, a situation where the user 20 has moved closer to the item 30*a* in the place 10*a*. The user 20 switches the operation mode of the portable system 100 to the inspection mode. Then, the reading range of the tag reader 110 is set to a relatively-narrow range $R_2$. In the example of FIG. 8A, the output strength of electromagnetic waves from the tag reader 110 has been lowered and, as a result, the radius of the reading range has been shortened. When the item tag 50*a* of the item 30*a* is detected by the tag reader 110 with this narrow range $R_2$, the inspection unit 232 determines that the item 30 exists at the current position of (or at least near) the tag reader 110. The inspection unit 232 can also consider that the user 20 has visually confirmed the item 30*a* in the vicinity of the item 30*a*. The position estimation unit 231 continues tracking the current position of the tag reader 110 using the self-localization technique. In the figure, the tag reader 110 is moving along the arrow $A_2$ together with the user 20.

According to this first practical example, it is possible to easily capture a position tag 40 with a broader reading range to quickly start estimation and tracking of the current position and then perform reliable inspection on an item location with a reading range that is narrowed at a necessary timing.

(2) Second Practical Example

According to a second practical example, a detection condition for the tag reader 110 to detect a wireless device in the inspection mode is stricter than a detection condition for the tag reader 110 to detect the wireless device in the search mode. For example, the inspection unit 232 or the control unit 111 of the tag reader 110 sets the minimum reception level $L_{min2}$ for detecting a wireless device in the inspection mode to a higher value compared to the minimum reception level $L_{min1}$ for detecting the wireless device in the search mode. Alternatively, the inspection unit 232 or the control unit 111 of the tag reader 110 sets the detection duration for detecting a wireless device in the inspection mode to a longer value compared to the detection duration for detecting the wireless device in the search mode.

FIG. 8B is an explanatory diagram for explaining the second practical example. FIG. 8B shows again, on the left-hand side, the situation where a user 20 carries the portable system 100 and visits the place 10*a*. At the beginning of the visit, the operation mode of the portable system 100 is the search mode, and the minimum reception level is set to the relatively-low $L_{min1}$ (which is loose as a detection condition). With this low minimum reception level $L_{min1}$, the tag reader 110 proactively captures the position tag 40*a* needed for estimation of the current position. In the example of FIG. 8B, the tag reader 110 reads the tag ID from the position tag 40*a* with a reception level $L_1$ that exceeds the minimum reception level $L_{min1}$. Once the position tag 40*a* is detected by the tag reader 110, the inspection unit 232 becomes aware that the tag reader 110 exists in the place 10*a*. There are the items 30*a* and 30*b* in the place 10*a*, and the item 30*a* is an inspection target item, for example. The position estimation unit 231 starts tracking the current position of the tag reader 110 using the self-localization technique with respect to the known position of the position tag 40*a*.

FIG. 8B shows, on the right-hand side, the situation where the user 20 has moved closer to the item 30*a* in the place 10*a*. The user 20 switches the operation mode of the portable system 100 to the inspection mode. Then, the minimum reception level is set to the relatively-high $L_{min2}$ (which is strict as a detection condition). When the item tag 50*a* of the item 30*a* is detected by the tag reader 110 with this strict detection condition, the inspection unit 232 determines that the item 30 exists at the current position of (or at least near) the tag reader 110. In the example of FIG. 8B, the tag reader 110 reads the tag ID from the item tag 50*a* with a reception level $L_2$ that exceeds the minimum reception level $L_{min2}$ ($L_{min2} > L_{min1}$). The inspection unit 232 can also consider that the user 20 has visually confirmed the item 30*a* in the vicinity of the item 30*a*. The position estimation unit 231 continues tracking the current position of the tag reader 110 using the self-localization technique.

According to this second practical example, it is possible to easily detect a position tag 40 with a looser detection condition to quickly start estimation and tracking of the current position and then perform reliable inspection on an item location with a stricter detection condition at a necessary timing.

(3) Third Practical Example

According to a third practical example, the portable system 100 performs notification to the user 20 with the above-described predetermined notification pattern when the tag reader 110 has read a tag ID from an item tag 50 of a target item (when a target item has been detected) in the inspection mode. On the other hand, the portable system 100 does not perform notification to the user 20 in the above-described predetermined notification pattern when the tag reader 110 has detected a target item in the search mode.

FIG. 8C is an explanatory diagram for explaining the third practical example. FIG. 8C shows, on the left-hand side, a situation where a user 20 carries the portable system 100 and approaches the item 30*a* that exists in the place 10*a*. The operation mode of the portable system 100 is set to the search mode. In the search mode, having approached the item 30*a*, the tag reader 110 reads the tag ID from the item tag 50*a* with a sufficient reception level, but the portable system 100 does not notify the user 20 that the item 30*a* has been detected as an inspection target item.

FIG. 8C shows, on the right-hand side, a situation where the user 20 approaches the item 30*a* that exists in the place 10*a* in a similar way. The operation mode of the portable system 100 is set to the inspection mode. In the inspection mode, having approached the item 30*a*, the tag reader 110 reads the tag ID from the item tag 50*a* with a sufficient reception level, and the portable system 100 notifies the user 20 that the item 30*a* has been detected as an inspection target item. The notified user 20 becomes aware that the inspection has been completed for the item 30*a* that was an inspection target item, or performs the above-described operation to the portable system 100 for completing inspection.

According to this third practical example, it is possible to perform notification to a user when a target item has been detected during a period when the user intends to inspect item locations so that the user can adequately know progression of the inspection. As a similar notification is not performed in normal times, the user will not be bothered by useless notifications.

The above-described three practical examples may be combined in any way with each other. For example, in the inspection mode, the reading unit 116 of the tag reader 110 may be configured with the narrower reading range than that of the search mode in accordance with the first practical example, and a notification when a target item has been detected may be performed to the user 20 in accordance with the third practical example. Likewise, in the inspection mode, a stricter detection condition than that of the search mode may be set in accordance with the second practical example, and a notification when a target item has been detected may be performed to the user 20 in accordance with the third practical example. The first and second practical examples may be combined with each other so that both of the narrower reading range and the stricter detection condition are used in the inspection mode. Furthermore, the portable system 100 may be capable of selectively operating one of three or more operation modes. For example, the portable system 100 may be made switchable by a user among the search mode, the inspection mode in the automatic update approach, and the inspection mode in the user-confirmed update approach.

3-4-2. Examples of UI

The inspection unit 232 provides a user with a user interface (UI) for assisting item location inspection via the user terminal 160. For example, the inspection unit 232 causes the display unit 171 of the user terminal 160 to display a current position of the tag reader 110 estimated by the position estimation unit 231 together with positions of one or more target items that exist in the vicinity of that position. Typically, the current position of the tag reader 110 and positions of the target items are displayed by being overlaid on a map image of the place 10 in which the tag reader 110 exists. By means of such a display, the user 20 is guided to the position of each target item while carrying the portable system 100.

Now, taking inventory counting work as an example, exemplary UIs displayed by the display unit 171 of the user terminal 160 will be described using FIGS. 9A to 9E.

Figure 9A:
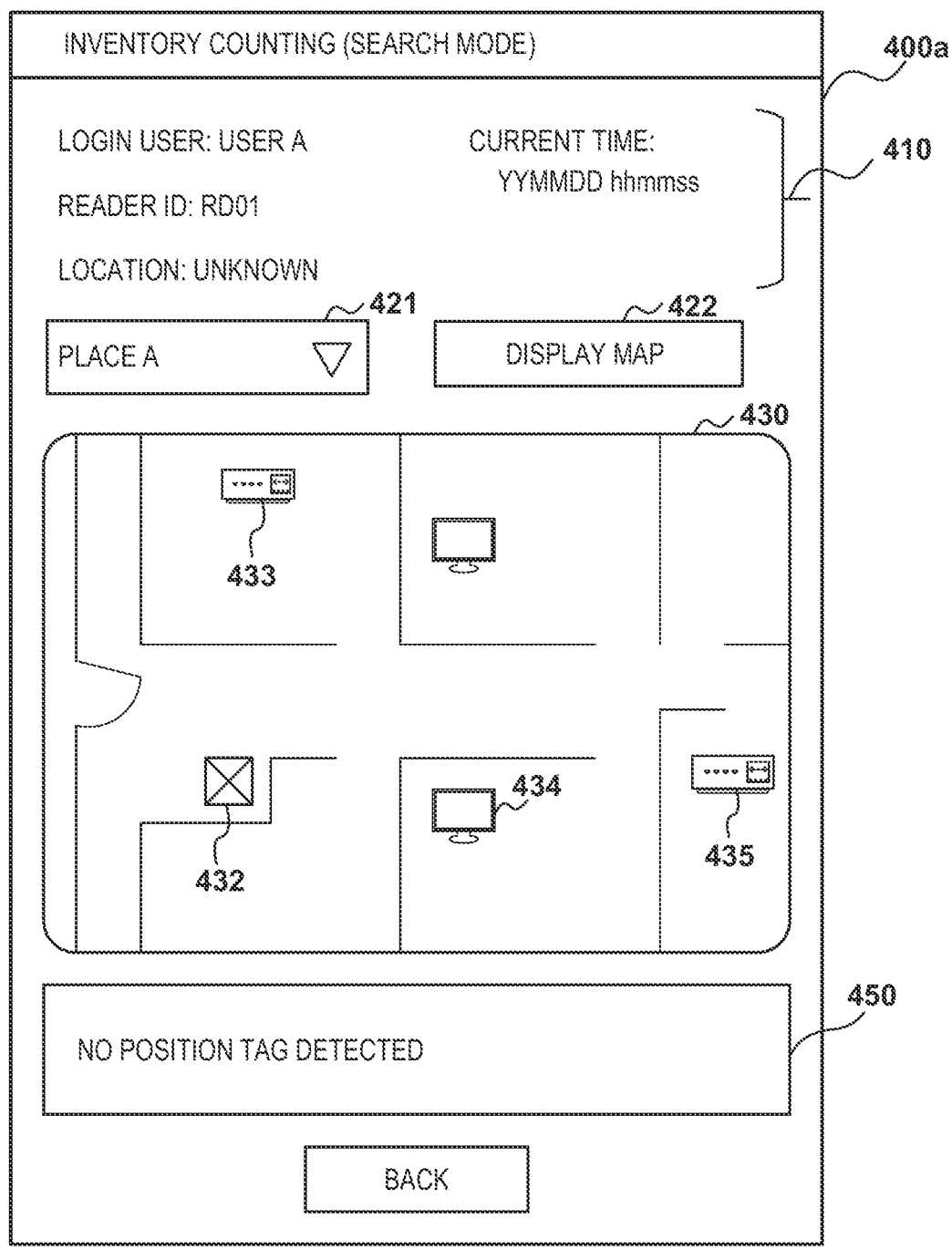
FIG. 9A is a first explanatory diagram for explaining an example of a user interface (UI) that may be provided for inventory counting work.

At the beginning of the inventory counting work, a user 20 accesses the management server 200 via the user terminal 160, passes login authentication, and invoke an inventory counting screen 400a illustrated in FIG. 9A. At this time, the operation mode of the portable system 100 is set to the search mode. The inventory counting screen 400a includes a basic information region 410, a place selection field 421, a map display button 422, a map display area 430, and a message display area 450. In the basic information region 410, a user name of the login user, a reader ID of a tag reader 110 associated with the login user, a current location of the tag reader 110, and the current time may be displayed, for example. However, at the point in time of FIG. 9A, the location of the tag reader 110 carried by the login user (the user 20 whose name is "User A") is unknown. When the user 20 selects an arbitrary place 10 in the place selection field 421 and operates the map display button 422, the inspection unit 232 causes a map image of the selected place 10 to be displayed in the map display area 430. Further, an icon 432 representing a position tag 40 installed in the selected place 10, and icons 433, 434, 435, . . . representing one or more items 30 that exist in the selected place 10 may be overlaid on the map image of the map display area 430. The types of icons of the items 30 may be determined depending on values of Type 314 in the item table 310, for example. In the message display area 450, a message that no position tag 40 has been detected at that point in time (and thus the current location of the tag reader 110 is unknown) may be displayed.

Figure 9B:
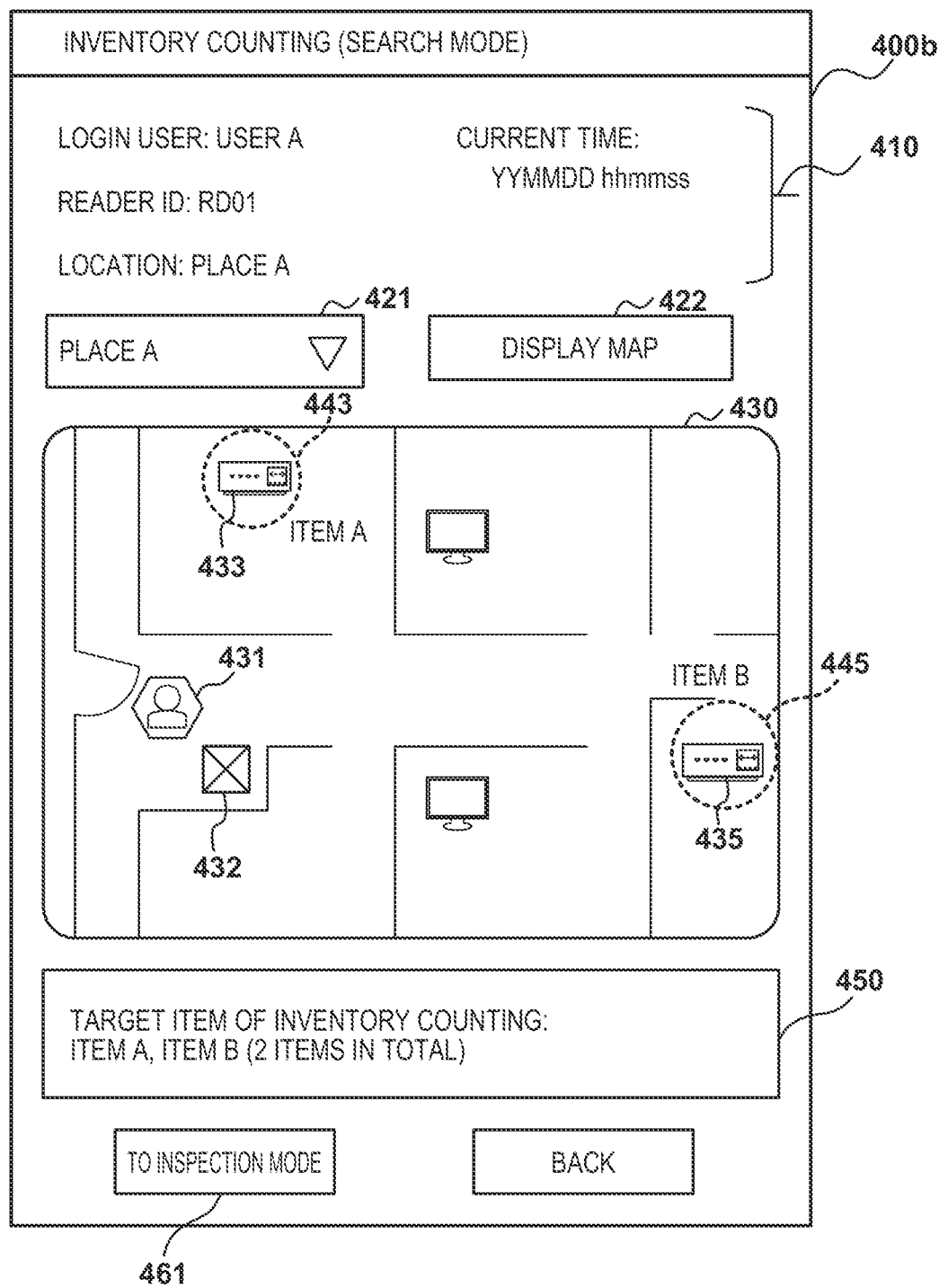
FIG. 9B is a second explanatory diagram for explaining an example of a UI that may be provided for inventory counting work.

When the tag reader 110 carried by the user 20 has detected a position tag 40, the displayed UI transitions from the inventory counting screen 400a to the inventory counting screen 400b illustrated in FIG. 9B. Herein, it is assumed that the position tag 40a installed in the place 10a having the name "Place A" has been detected. The inspection unit 232 causes the place selection field 421 of the inventory counting screen 400b to display "Place A" and the map display area 430 to display a map image of the place 10a. In addition, the inspection unit 232 causes an icon 431 representing the login user (or the tag reader 110) to be displayed at the current position of the tag reader 110 on the map image of the place 10a. Further, the inspection unit 232 specifies the items 30a and 30b, which exist in the place 10a and of which inspection statuses are "Uncompleted" as target items of inventory counting. Then, the inspection unit 232 adds a text of the name "Item A" and a mark 443 to the icon 433 representing the item 30a and adds a text of the name "Item B" and a mark 445 to the icon 435 representing the item 30b and causes these icons to be displayed at respective positions. The marks 443 and 445 indicate that the items 30a and 30b are the target items of inventory counting, respectively. In the message display area 450, a message that two target items of inventory counting in total, which are 'Item A' and 'Item B', exist in the vicinity of the user 20 may be displayed. The user 20 browses this inventory counting screen 400b, and thereby realizes in which direction he or she should move in the place 10a so that the target item of inventory counting can be confirmed and the inspection can be proceeded. The inspection unit 232 may cause detailed information (for example, one or more of the item name, item ID, type, positional coordinates, and work deadline) regarding the item 30a or 30b to be displayed on the screen when the corresponding icon 433 or 435 is operated in the map display area 430.

The inventory counting screen 400b includes a mode transition button 461. When the user 20 operates the mode transition button 461, the operation mode of the portable system 100 is switched from the search mode to the inspection mode. The control unit 161 of the user terminal 160 notifies the inspection unit 232 of the management server 200 of the switching of the operation mode. The control unit 111 of the tag reader 110 is notified of the switching of the operation mode indirectly via the management server 200, or directly over a connection with the user terminal 160. The user 20 may switch the operation mode of the portable system 100 from the search mode to the inspection mode at any point in time after the position tag 40a is detected by the tag reader 110.

Figure 9C:
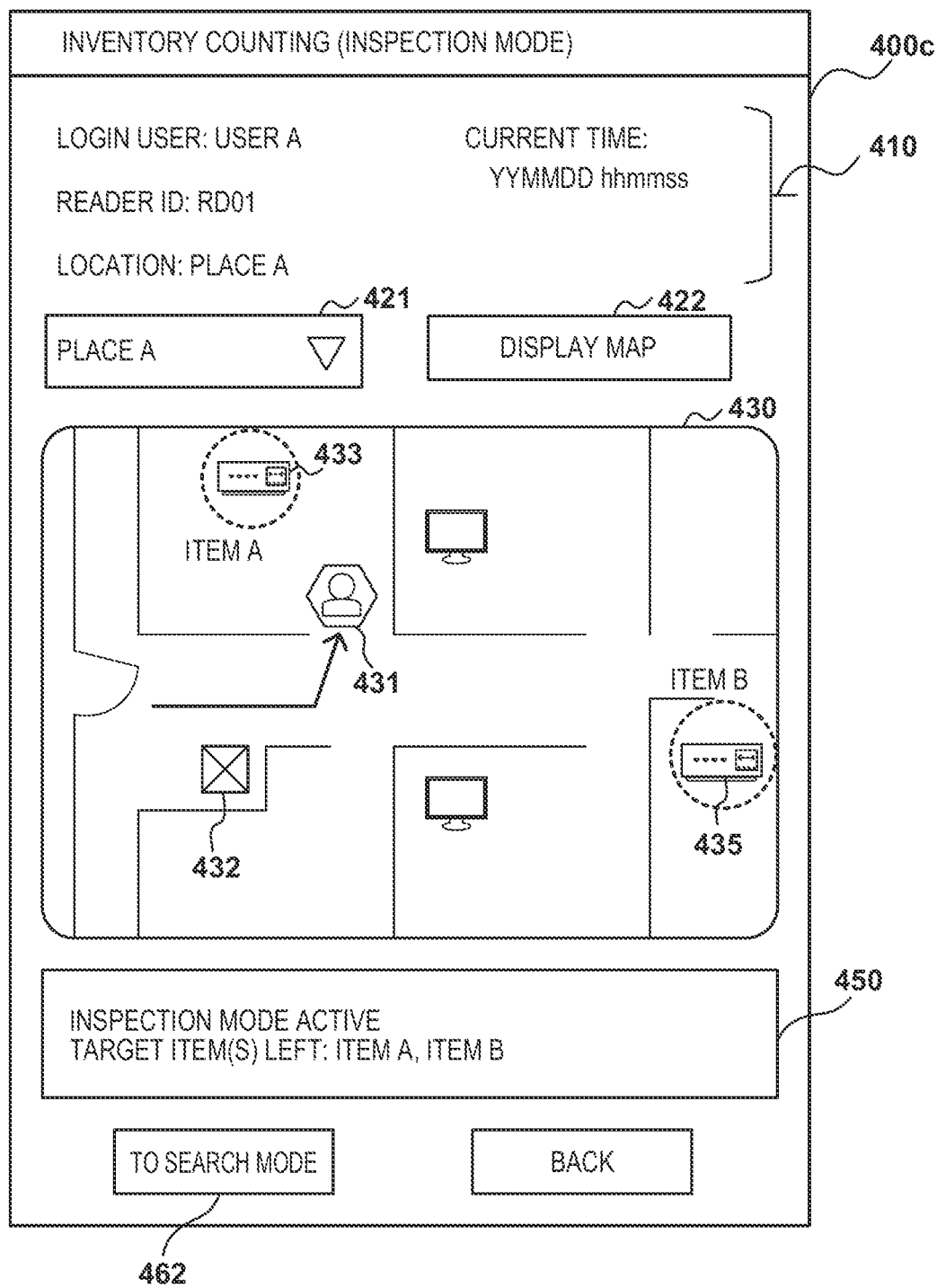
FIG. 9C is a third explanatory diagram for explaining an example of a UI that may be provided for inventory counting work.
Figure 9D:
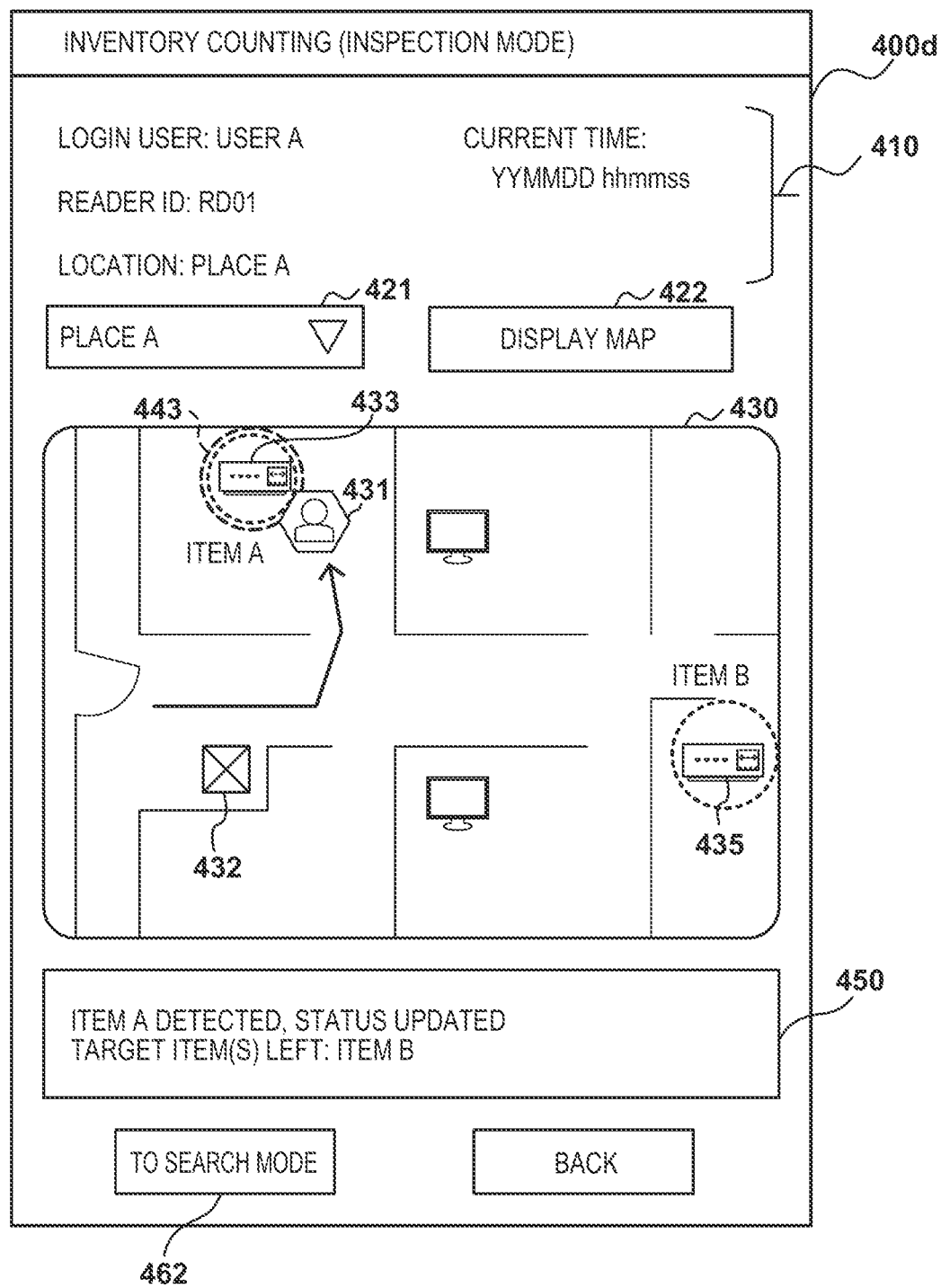
FIG. 9D is a fourth explanatory diagram for explaining an example of a UI that may be provided for inventory counting work.
Figure 9E:
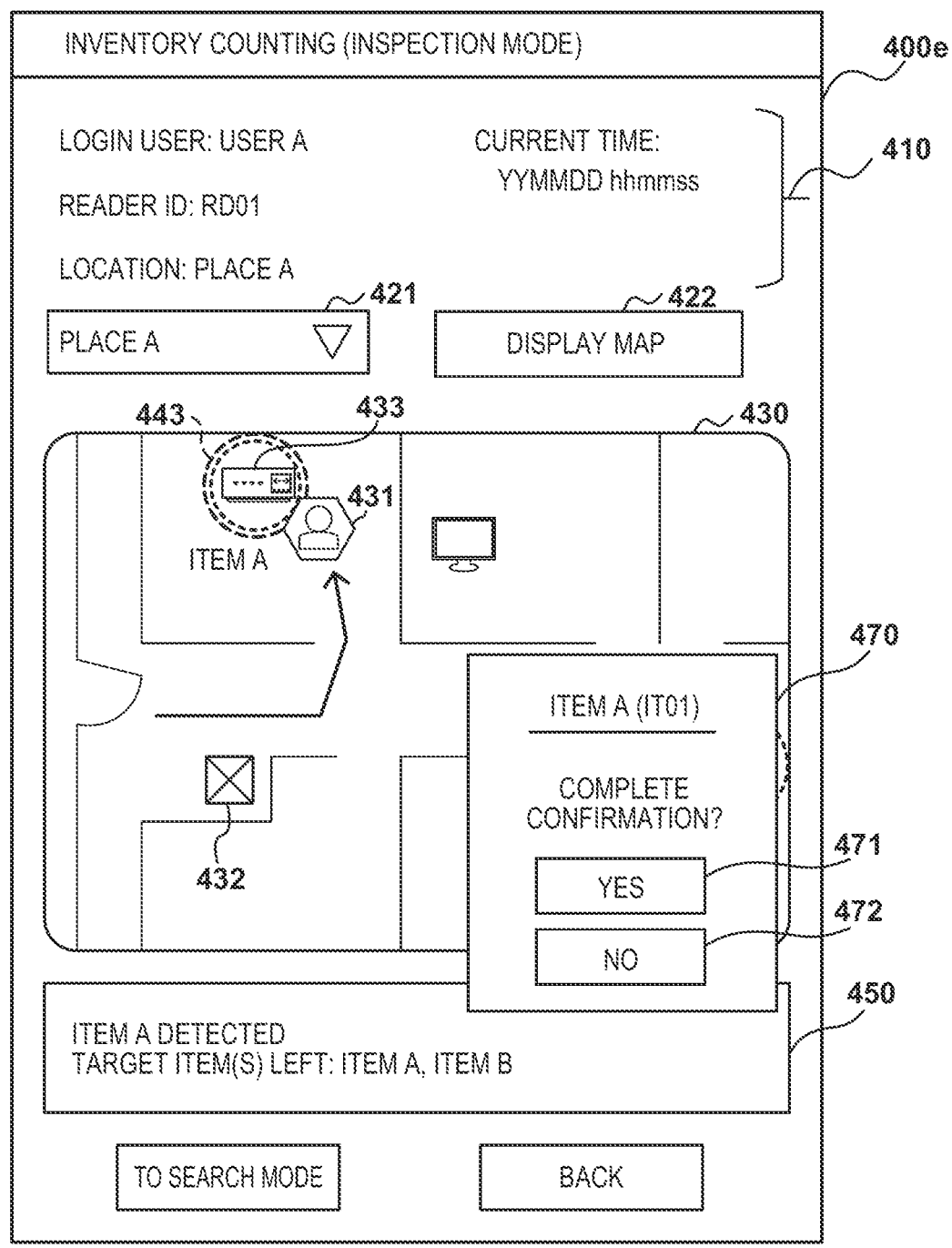
FIG. 9E is a fifth explanatory diagram for explaining an example of a UI that may be provided for inventory counting work.

When the operation mode of the portable system 100 is switched to the inspection mode, the displayed UI transitions from the inventory counting screen 400b to the inventory counting screen 400c illustrated in FIG. 9C. Irrespective of the operation mode of the portable system 100, the position estimation unit 231 continues tracking of the position of the tag reader 110 after the detection of the position tag 40a, and the icon 431 moves in the map display area 430 in such a manner that it reflects the estimated position of the tag reader 110 (see the arrow in the figure). In the inventory counting screen 400c, the user 20 may switch the operation mode of the portable system 100 from the inspection mode back to the search mode by operating the mode transition button 462.

In the inspection mode, when the user 20 has approached the item 30a to such an extent that the condition to detect a wireless device is satisfied, the tag reader 110 detects the item 30a (reads the tag ID from the item tag 50a attached to the item 30a). At this time, the displayed UI transitions from the inventory counting screen 400c to the inventory counting screen 400d illustrated in FIG. 9D, for example. In the inventory counting screen 400d, the inspection unit 232 highlights the icon 433 of the detected item 30a or the mark 443 added to the icon 433 (by blinking or a change in color, for example) so that it represents that the item 30a has been detected. The inspection unit 232 determines that the fact that the item 30a having been one of the target items of inventory counting exists in the place 10a has been confirmed based on the result of reading of the tag ID from the item tag 50a. The inspection unit 232 updates the value of Status 373 (that has been "Uncompleted") of the inspection record associated with the item 30a in the inspection table 370 to "Completed" based on this determination. In addition, the inspection unit 232 adds the current date and time to Completion Date & Time 374, the place ID of the place 10a to Place 375, the coordinates of the current position of the tag reader 110 estimated at that point in time to Coordinates 376 of the same inspection record. As a consequence, the inventory counting work for the item 30a is completed, and the user 20 will move toward the item 30b, which is the remaining target item. The inspection unit 232 may change the mark 443 that has been added to the icon 433 of the item 30a to another mark representing inspection completed, or may erase the mark 443 on the screen. Note that icons of items 30 which are non-target items of the inspection and icons of items 30 for which the inspection has been completed may be or may not be displayed on the screen.

In the practical embodiment where the user-confirmed update approach is employed, the displayed UI is transitioned to the inventory counting screen 400e when the item 30a which is a target item has been detected in the inspection mode. A pop-up dialog 470 is overlaid on the inventory counting screen 400e, and the pop-up dialog 470 includes a message which prompts the user 20 to complete confirmation of the item 30a, and buttons 471 and 472. When the user 20 operates the button 471 labeled with "YES", the inspection unit 232 updates the inspection record corresponding to the item 30a in the inspection table 370 as described in connection with FIG. 9D based on the completed confirmation on the fact that the item 30a exists in the place 10a. When the user 20 operates the button 472 labeled with "NO", the inspection record corresponding to the item 30a is not updated.

The configurations of UIs for assisting item location inspection are not limited to the examples illustrated in FIGS. 9A to 9E. Each screen may include one or more additional screen elements, and may not include some of the illustrated screen elements. Each screen may be a web screen displayed by a web browser, or may be an application screen displayed by another application that runs in the user terminal 160. Moreover, the inspection unit 232 may provide the user 20 with a speech UI instead of or in addition to the illustrated GUIs.

Herein, though an example where the operation mode of the portable system 100 is switched from the search mode to the inspection mode in response to the operation on the mode transition button 461 by the user 20 has been described, the switching of the operation mode may be automatically performed without relying on a user operation. Such a switching scheme of the operation mode is referred to as an automatic switching approach. In the automatic switching approach, the control unit 161 of the user terminal 160 may set the operation mode periodically and alternately to the search mode and the inspection mode according to a time measured by a timer. In this example, the inspection unit 232 updates the status of a target item when the tag reader 110 has detected the target item during a period in which the portable system 100 is operating in the inspection mode. According to the automatic switching approach, the user 20 can efficiently proceed the inspection for a large number of items by repeating search and item inspection on items without a need to frequently perform operations for switching the operation mode.

4. FLOW OF PROCESSING

In this section, some examples of flows of processing that may be performed by the item inspection system 1 will be described using the flowcharts of FIGS. 10A to 13. Note that a process step is abbreviated as S (step) in the following descriptions.

4-1. Item Inspection Processing (Portable System)

Figure 10A:
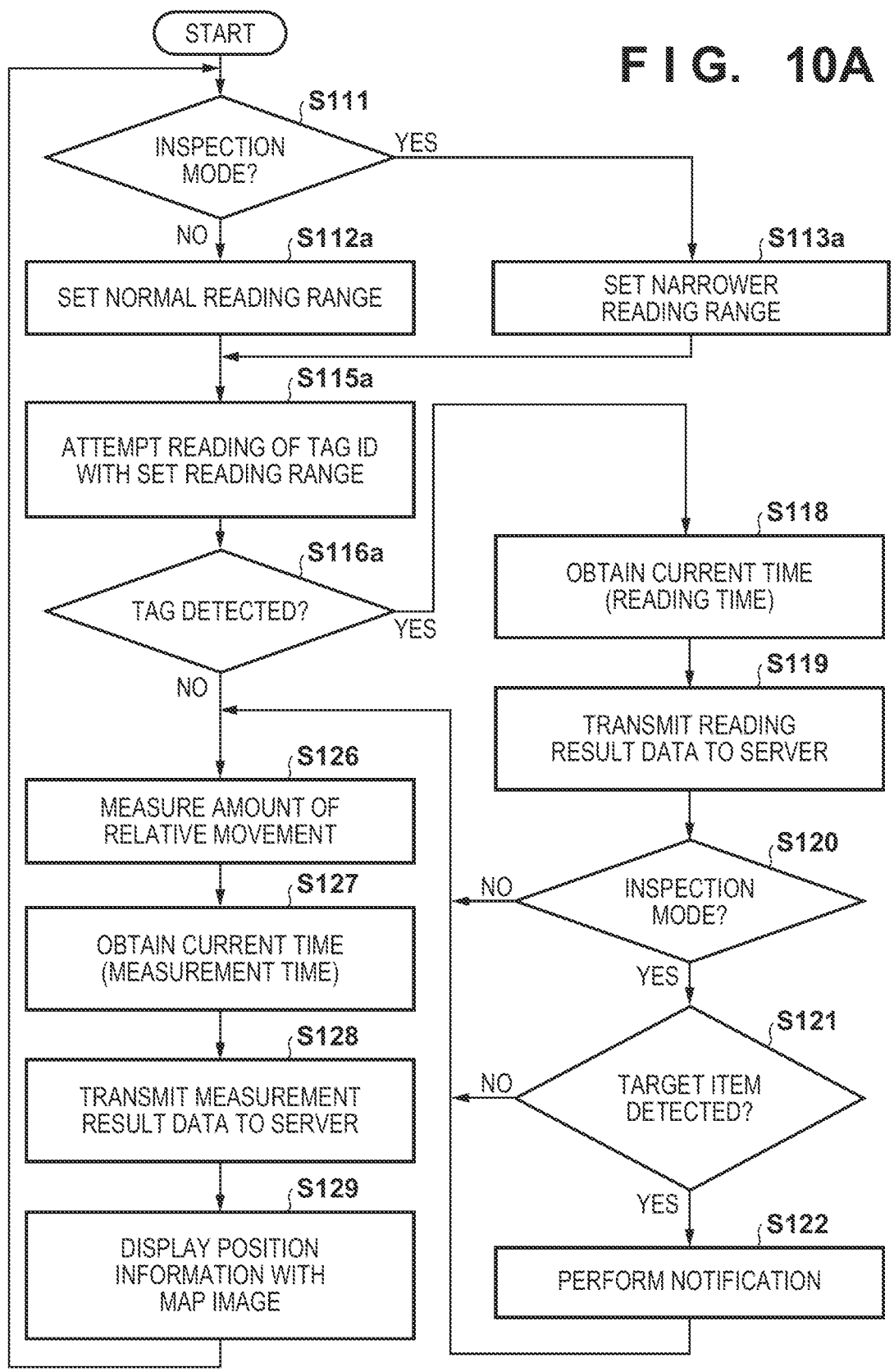
FIG. 10A is a flowchart illustrating a first example of a flow of item inspection processing that may be performed by the portable system.
Figure 10B:
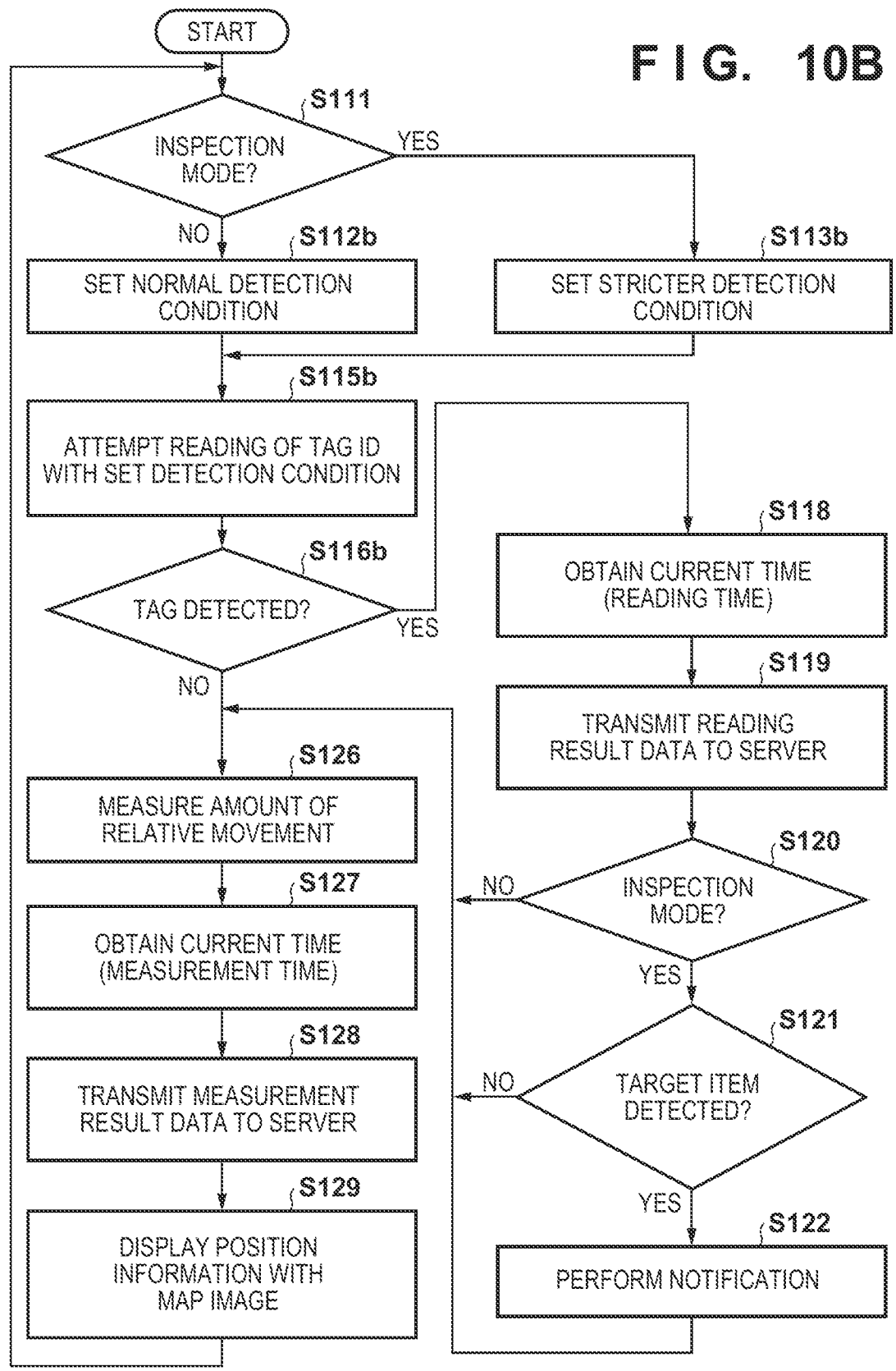
FIG. 10B is a flowchart illustrating a second example of a flow of item inspection processing that may be performed by the portable system.
Figure 10C:
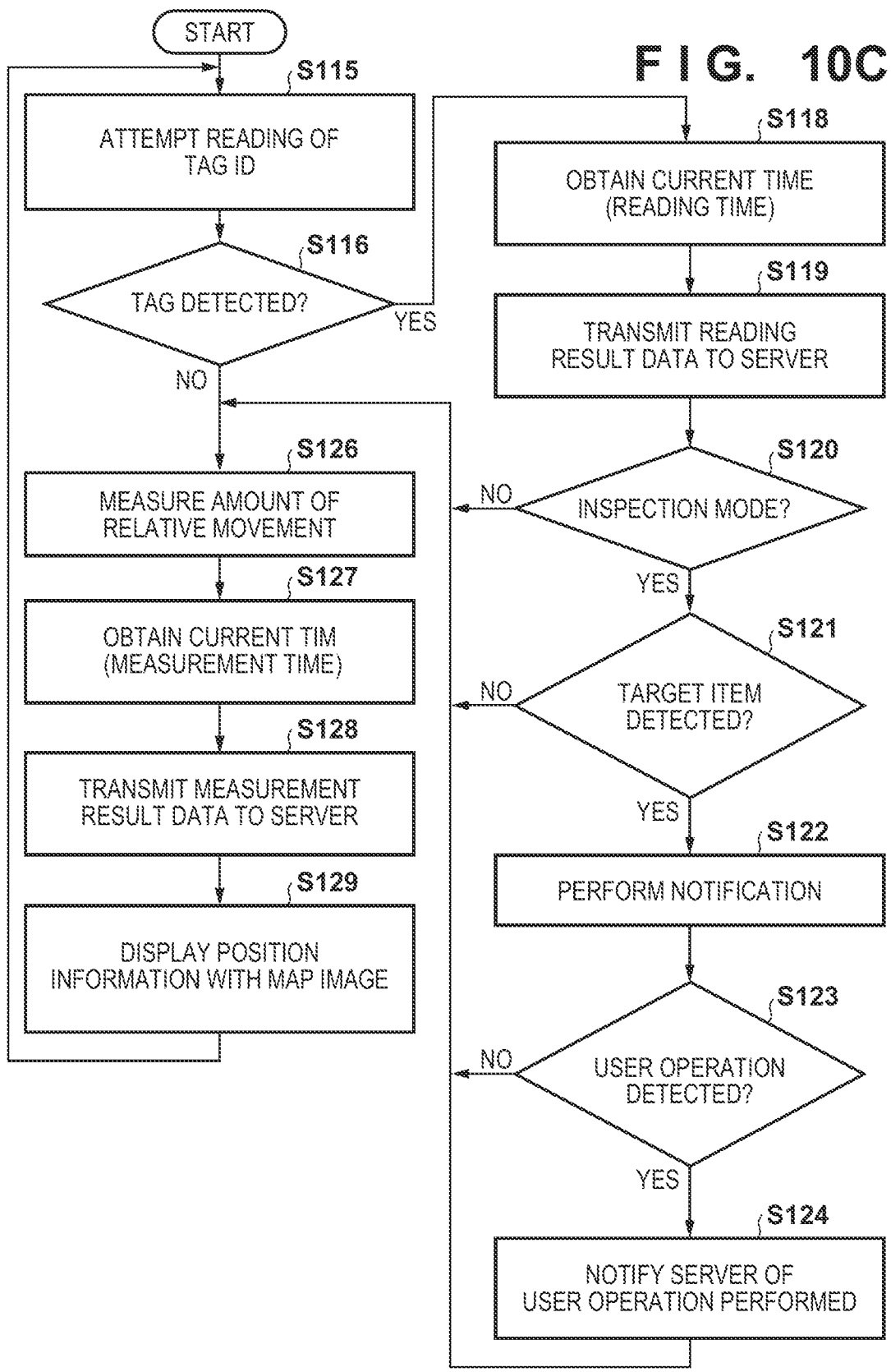
FIG. 10C is a flowchart illustrating a third example of a flow of item inspection processing that may be performed by the portable system.

FIGS. 10A to 10C are flowcharts illustrating respective examples of flows of item inspection processing performed by the portable system 100. The item inspection processing may be initiated when a user operation to activate the inspection function (for example, a function to assist inventory counting) has been performed in the portable system 100.

(1) First Example

The item inspection processing according to a first example of FIG. 10A corresponds to the combination of the first practical example described using FIG. 8A and the third practical example described using FIG. 8C. It is also assumed that the automatic update approach is employed for updating inspection statuses.

First, in S111, the control unit 111 of the tag reader 110 determines whether the operation mode is set to the search mode or the inspection mode. In a case where the operation mode is set to the search mode, in S112a, the control unit 111 sets a reading range with a normal size in the reading unit 116. Meanwhile, in a case where the operation mode is set to the inspection mode, in S113a, the control unit 111 sets a narrower reading range than the reading range of the search mode in the reading unit 116.

Next, in S115a, the reading unit 116 of the tag reader 110 attempts to read a tag ID from a nearby RFID tag by emitting electromagnetic waves within the set reading range. When a tag ID has been received from a nearby RFID tag utilizing the energy of the electromagnetic waves as a result of the attempt of tag reading (S116a—YES), the processing proceeds to S118. Meanwhile, when no tag ID is received (S116a—NO), the processing proceeds to S126.

In S118, the control unit 111 obtains the current time as a reading time of the tag ID by referring to an internal real-time clock, for example. Next, in S119, the control unit 111 transmits reading result data including the read tag ID, the reading time, the reception level, and the reader ID of the tag reader 110 to the management server 200 via the communication unit 113. Further, in a case where the operation mode is set to the inspection mode (S120—YES), in S121, the processing branches depending on whether the tag reader 110 has detected an inspection target item. When a target item has been detected, in S122, one or both of the tag reader 110 and the user terminal 160 perform notification to the user 20 that the target item has been detected. The notification herein may be performed based on a notification command received from the management server 200 or may be performed based on autonomous control at the tag reader 110 or the user terminal 160. At this time, the inspection status of the target item is updated to "Completed" in the management server 200. Meanwhile, in a case where the operation mode is set to the search mode (S120—NO), the steps in S121 and S122 are skipped. Then, the processing proceeds to S126.

In S126, the measuring unit 114 of the tag reader 110 measures a relative amount of movement of the tag reader 110 based on sensor data output from a three-axis acceleration sensor, a gyro sensor, and a geomagnetic sensor, for example. Next, in S127, the control unit 111 obtains the current time as a measurement time. Then, in S128, the control unit 111 transmits measurement result data including the relative amount of movement measured by the measuring unit 114, the measurement time, and the reader ID of the tag reader 110 to the management server 200 via the communication unit 113.

Next, in S129, the control unit 161 of the user terminal 160 receives from the management server 200 a map image of a place 10 and position information of one or more items 30 to be displayed, and causes the display unit 171 to display the received map image and the position information. In a case where a position tag 40 has already been detected, the map image displayed herein is a map image of the place 10 in which the detected position tag 40 is installed If there is one or more inspection target items existing in that place 10, screen elements (for example, icons or marks) that identify those target items may be displayed on the screen. If the current position of the portable system 100 is estimated by the management server 200, the current position of the portable system 100 may also be displayed on the screen.

Then, the processing returns to S111. Such item inspection processing may be iterated until a user operation to stop the inspection function is performed on the portable system 100, and the screen display at S129 may be updated in real time as the user 20 moves and the tag reading progresses.

(2) Second Example

The item inspection processing according to a second example of FIG. 10B corresponds to the combination of the second practical example described using FIG. 8B and the third practical example described using FIG. 8C. It is also assumed that the automatic update approach is employed for updating inspection statuses.

First, in S111, the control unit 111 of the tag reader 110 determines whether the operation mode is set to the search mode or the inspection mode. In a case where the operation mode is set to the search mode, in S112*b*, the control unit 111 sets the normal condition (relatively loose condition) as the detection condition for detecting an RFID tag. Meanwhile, in a case where the operation mode is set to the inspection mode, in S113*b*, the control unit 111 sets the stricter condition (for example, the higher minimum reception level or the longer detection duration) as the detection condition for detecting an RFID tag.

Next, in S115*b*, the reading unit 116 of the tag reader 110 attempts to read a tag ID from a nearby RFID tag by emitting electromagnetic waves within the reading range. When a tag ID has been received from a nearby RFID tag in the manner that the set detection condition is satisfied as a result of the attempt of tag reading (S116*b*—YES), the processing proceeds to S118. Meanwhile, when no tag ID is received or none of received ones satisfies the set detection condition (S116*b*—NO), the processing proceeds to S126.

Details of the processing in S118 to S129 may be similar to those described using FIG. 10A. Hence, the descriptions thereof are not repeated herein. The item inspection processing may be iterated until a user operation to stop the inspection function is performed on the portable system 100, and the screen display at S129 may be updated in real time as the user 20 moves and the tag reading progresses.

(3) Third Example

The item inspection processing according to a third example of FIG. 10C corresponds to the third practical example described using FIG. 8C. It is also assumed that the user-confirmed update approach is employed for updating inspection statuses.

First, in S115, the reading unit 116 of the tag reader 110 attempts to read a tag ID from a nearby RFID tag by emitting electromagnetic waves within the reading range. When a tag ID has been received from a nearby RFID tag utilizing the energy of the electromagnetic waves as a result of the attempt of tag reading (S116—YES), the processing proceeds to S118. Meanwhile, when no tag ID is received or none of received ones satisfies a detection condition (S116-NO), the processing proceeds to S126.

Then, in S118, the control unit 111 obtains the current time as a reading time of the tag ID. Next, in S119, the control unit 111 transmits reading result data including the read tag ID, the reading time, the reception level, and the reader ID of the tag reader 110 to the management server 200 via the communication unit 113. Further, in a case where the operation mode is set to the inspection mode (S120—YES), in S121, the processing branches depending on whether the tag reader 110 has detected an inspection target item. When a target item has been detected, in S122, the notification unit 170 of the user terminal 160 performs notification to the user 20 that the target item has been detected. Next, in S123, the user terminal 160 waits for a predetermined user operation for inspection completion. For example, when the predetermined user operation has been detected by the operation unit 165, in S124, the control unit 161 of the user terminal 160 notifies the management server 200 that the predetermined user operation has been performed. In this way, the inspection status of the target item is updated to "Completed" in the management server 200. Meanwhile, in a case where the operation mode is set to the search mode (S120-NO), the steps in S121 to S124 are skipped. Then, the processing proceeds to S126.

Details of the processing in S126 to S129 may be similar to those described using FIG. 10A. Hence, the descriptions thereof are not repeated herein. The item inspection processing is iterated until a user operation to stop the inspection function is performed on the portable system 100, and the screen display at S129 is updated in real time as the user 20 moves and the tag reading progresses.

4-2. Guiding Processing (Management Server)

Figure 11A:
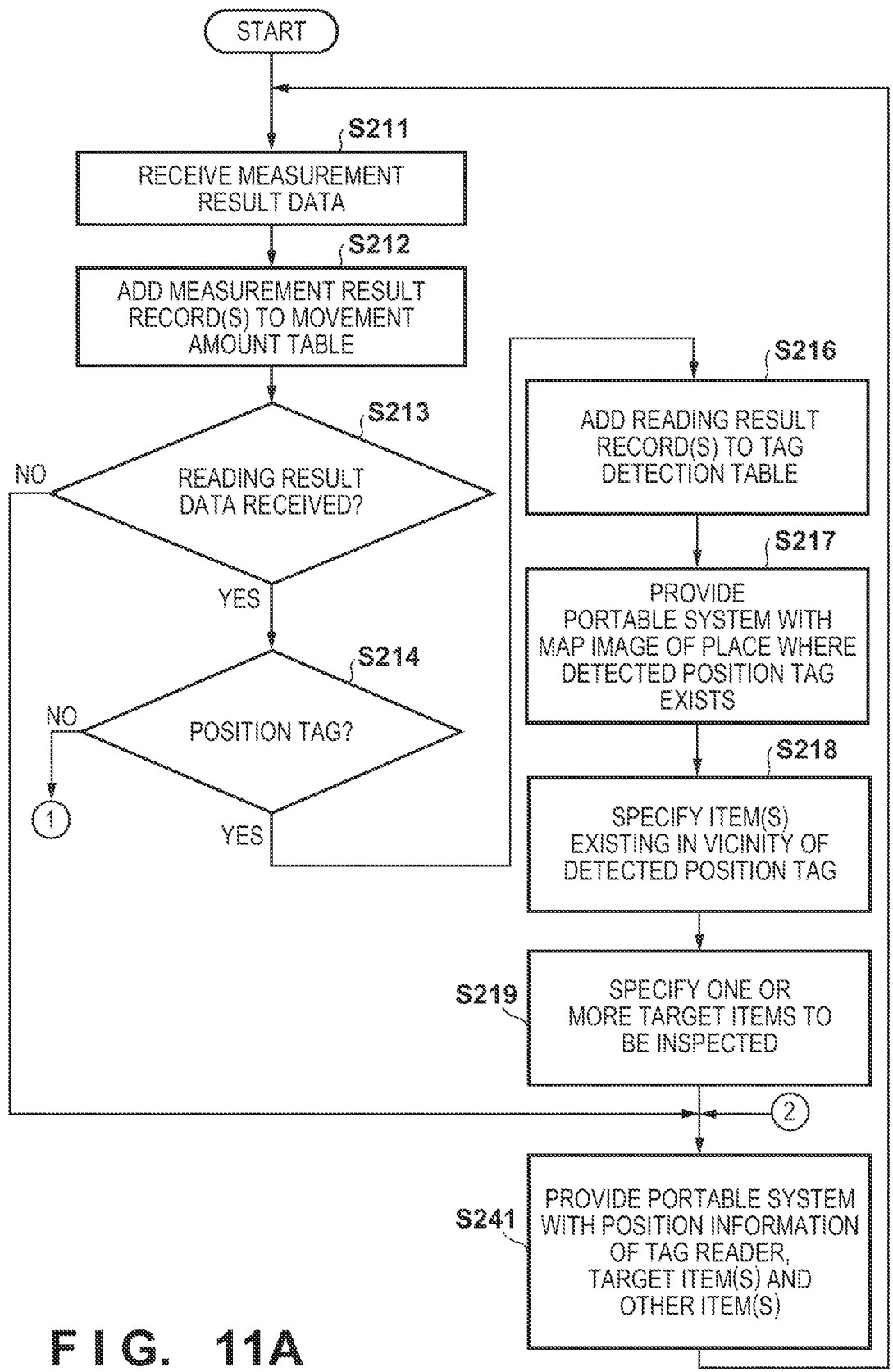
FIG. 11A is a first portion of a flowchart illustrating an example of a flow of guiding processing performed by the management server.
Figure 11B:
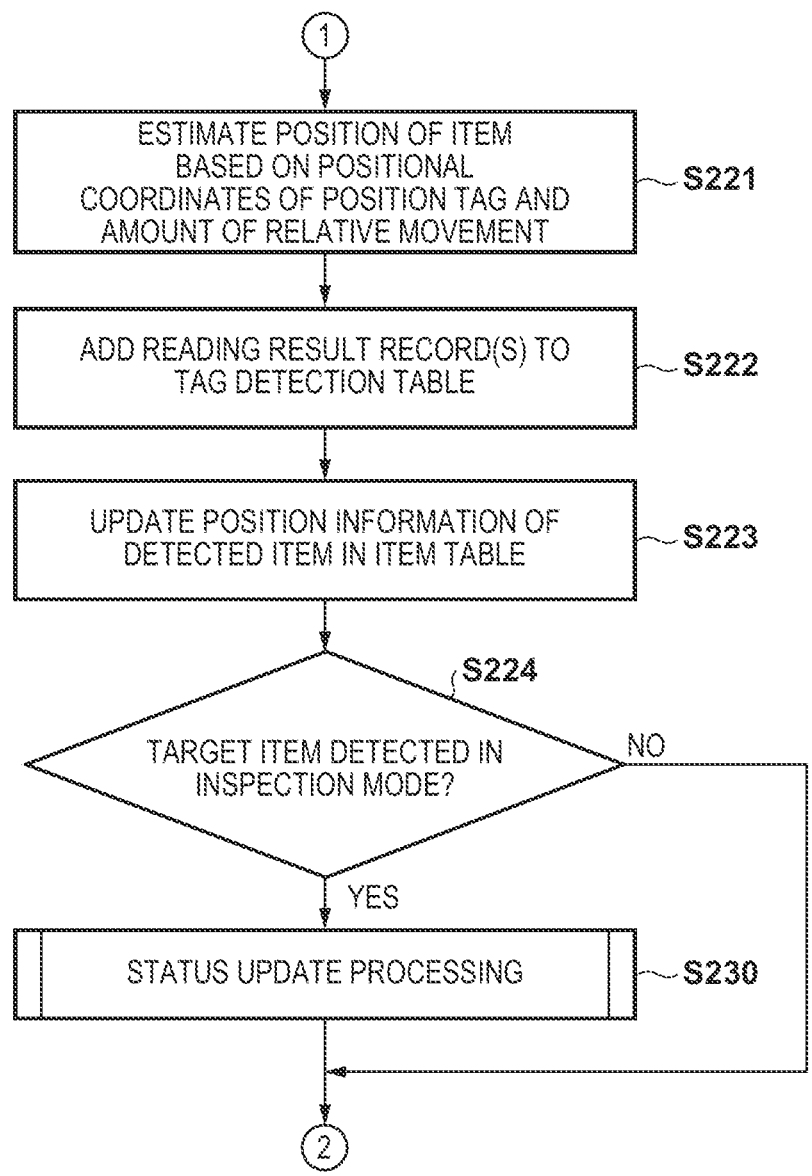
FIG. 11B is a second portion of the flowchart illustrating the example of the flow of the guiding processing performed by the management server.

FIGS. 11A and 11B show a flowchart illustrating an example of a flow of guiding processing performed by the management server 200. This guiding processing may be repeated while the above-described inspection function is running in the portable system 100 and there remains at least one target item for which the inspection is uncompleted.

First, in S211, the position estimation unit 231 of the management server 200 receives measurement result data transmitted periodically from the tag reader 110. Next, in S212, the position estimation unit 231 adds, to the movement amount table 350, a measurement result record including a measurement time, a reader ID, and an amount of movement indicated by the received measurement result data With repeatedly performing S211 and S212, the position estimation unit 231 waits for reading result data received from the tag reader 110 in S213. When the reading result data is received from the tag reader 110, the processing proceeds to S214. In S214, the processing branches depending on which of a position tag 40 and an item tag 50 has been detected by the tag reader 110. In a case where a position tag 40 has been detected by the tag reader 110 (reading result data for a position tag 40 is received), the processing proceeds to S216. Meanwhile, in a case where an item tag 50 has been detected by the tag reader 110 (reading result data for an item tag 50 is received), the processing proceeds to S221. In a case where no reading result data is received from the tag reader 110 in S213, the processing proceeds to S241.

In S216, the position estimation unit 231 adds, to the tag detection table 360, a reading result record including a reading time, a tag ID, a reception level, and a reader ID indicated by the reading result data for the detected position tag 40. In S217, the inspection unit 232 obtains map image data of the place 10 in which the detected position tag 40 exists from the place table 320, and provides the portable system 100 with the obtained map image data (for example, transmits it to the user terminal 160). Next, in S218, the inspection unit 232 specifies one or more items that exist around the known position of the detected position tag 40 by referring to the item table 310 and the place table 320. Next, in S219, the inspection unit 232 specifies inspection target item(s), which are item(s) for which Status 373 indicates "Uncompleted" in the inspection table 370, out of the items specified in S218. Then, the processing proceeds to S241.

In S221, the position estimation unit 231 estimates a position of the detected item 30 based on the amount of relative movement of the tag reader 110 at the reading time indicated by the reading result data for the detected item tag 50. For example, the position estimation unit 231 can estimate positional coordinates of the detected item 30 using the technique described in connection with the above formula (1). Note that S221 may be skipped until a position tag 40 is detected for the first time after the tag reader 110 is activated. Next, in S222, the position estimation unit 231 adds, to the tag detection table 360, a reading result record including a reading time, a tag ID, a reader ID, and a reception level of the detected item tag 50, and the positional coordinates estimated in S221. Next, in S233, the position estimation unit 231 updates position information of the detected item 30 in the item table 310 (for example, values of Place 315 and Coordinates 316).

Next, in S224, the inspection unit 232 determines whether the tag reader 110 has detected a target item specified in S219 while the portable system 100 is operating in the inspection mode. In a case where the tag reader 110 has detected a target item while the portable system 100 is operating in the inspection mode, in S230, the inspection unit 232 performs status update processing described next. In a case where the portable system 100 is not operating in the inspection mode or an item 30 that is not a target item has been detected by the tag reader 110, the status update processing in S230 is skipped. Then, the processing proceeds to S241. In S241, the inspection unit 232 provides the portable system 100 with position information of the tag reader 110, one or more target items and other items 30 (for example, transmits it to the user terminal 160). As a result, the current position of the tag reader 110 and positions of one or more target items to be inspected are displayed in a manner that they are overlaid on a map image by the display unit 171 of the user terminal 160, for example, so that the user 20 is guided to a position at which a target item is assumed to exist. Note that, until a position tag 40 is detected after the tag reader 110 is activated, the current position of the tag reader 110 may not be provided to the portable system 100 because it is unknown. Moreover, provision of information that has not been updated after it was previously provided may be omitted. Then, the processing returns to S211 and the above-described guiding processing is repeated.

4-3. Status Update Processing (Management Server)

Figure 12A:
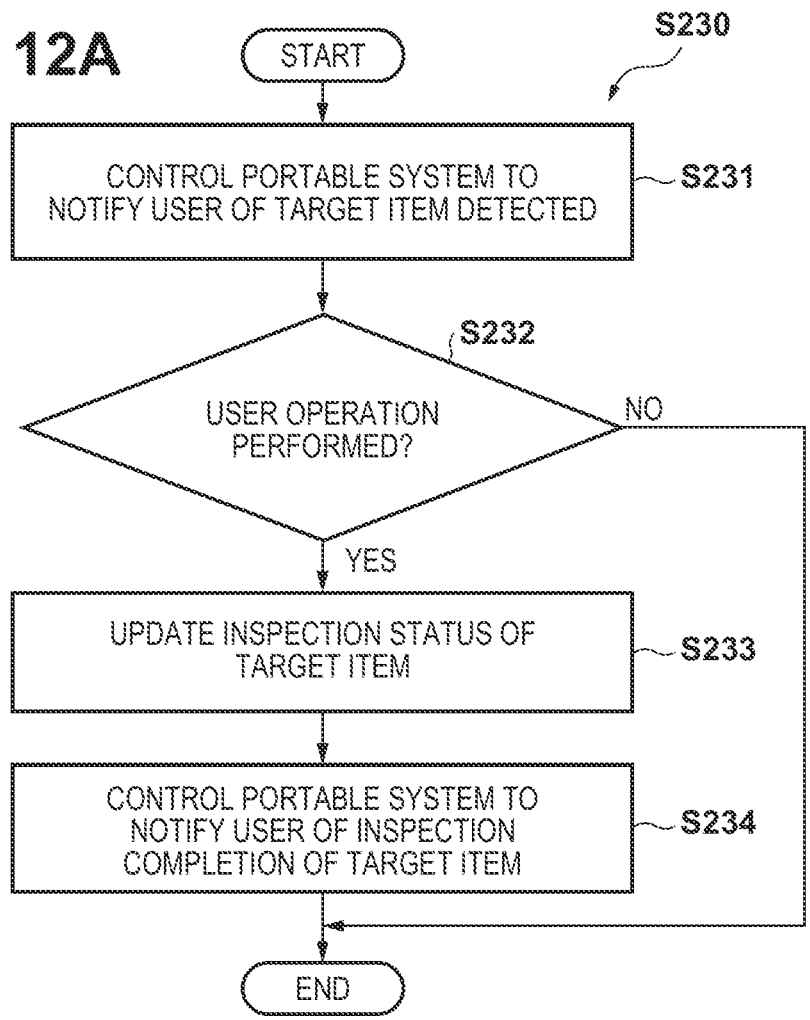
FIG. 12A is a flowchart illustrating a first example of a concrete flow of the status update processing illustrated in FIG. 11B.
Figure 12B:
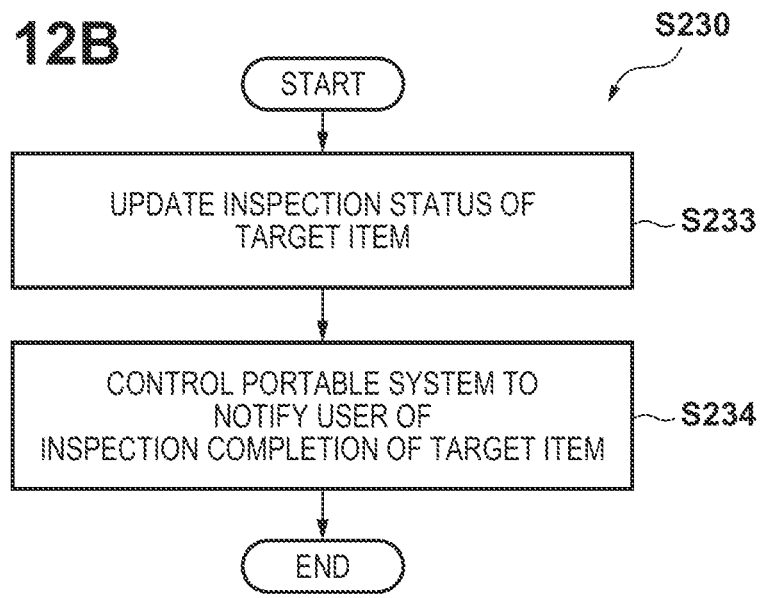
FIG. 12B is a flowchart illustrating a second example of a concrete flow of the status update processing illustrated in FIG. 11B.

FIGS. 12A and 12B show flowcharts illustrating respective examples of a flow of status update processing performed by the management server 200. The status update processing may be performed by the inspection unit 232 in S230 of FIG. 11B.

(1) First Example (User-Confirmed Update Approach)

The status update processing according to a first example of FIG. 12A is processing for the above-described user-confirmed update approach.

First, in S231, the inspection unit 232 controls the portable system 100 to notify the user 20 that the tag reader 110 has detected an inspection target item. For example, the inspection unit 232 instructs the user terminal 160 via the communication unit 210 to perform the notification, and the control unit 161 of the user terminal 160 that has received the instruction causes the notification unit 170 to perform the notification with a predetermined notification pattern to the user 20. For example, as described using FIGS. 9D and 9E, the display unit 171 highlights a screen element associated with the detected target item on a screen and displays a message prompting to complete confirmation of the target item.

Next, in S232, the inspection unit 232 waits for a predetermined user operation for inspection completion on the portable system 100. Upon receiving a notification that the predetermined user operation has been performed, in S233, the inspection unit 232 updates the value of Status 373 of the inspection record corresponding to the detected target item in the inspection table 370 to "Completed". In addition, the inspection unit 232 adds respective values to Completion Date & Time 374, Place 375, and Coordinates 376 of the same inspection record. Then, in S234, the inspection unit 232 controls the portable system 100 to notify the user 20 of the inspection completion of the detected target item. For example, the inspection unit 232 instructs the user terminal 160 via the communication unit 210 to perform the notification, and the control unit 161 of the user terminal 160 that has received the instruction causes the display unit 171 to display a message that means the inspection completion. Then, the status update processing of FIG. 12A ends.

(2) Second Example (Automatic Update Approach)

The status update processing according to a second example of FIG. 12B is processing for the above-described automatic update approach.

First, in S233, the inspection unit 232 updates the value of Status 373 of the inspection record corresponding to the detected target item in the inspection table 370 to "Completed" without requiring a user operation on the portable system 100. In addition, the inspection unit 232 adds respective values to Completion Date & Time 374, Place 375, and Coordinates 376 of the same inspection record. Then, in S234, the inspection unit 232 controls the portable system 100 to notify the user 20 of the inspection completion of the detected target item. For example, the inspection unit 232 instructs the user terminal 160 via the communication unit 210 to perform the notification, and the control unit 161 of the user terminal 160 that has received the instruction causes the display unit 171 to display a message that means the inspection completion. Then, the status update processing of FIG. 12B ends.

4-4. Mode Switching Processing in Automatic Switching Approach

Figure 13:
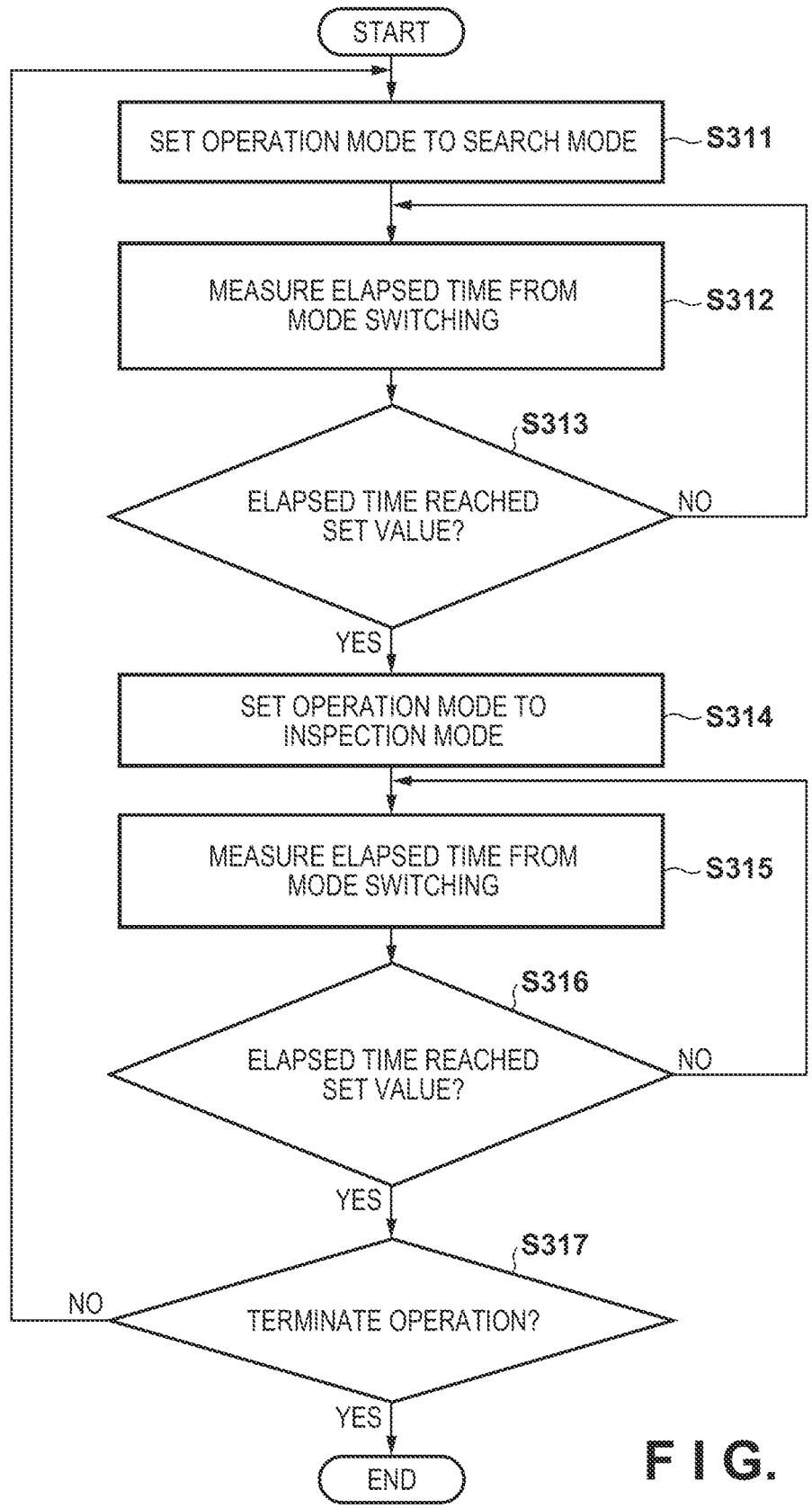
FIG. 13 is a flowchart illustrating an example of a flow of mode switching processing that may be performed by the portable system in an alteration example.

FIG. 13 is a flowchart illustrating an example of a flow of mode switching processing for the portable system 100 to switch the operation mode in accordance with the automatic switching approach in an alteration example. The mode switching processing may be performed by the control unit 161 of the user terminal 160, for example.

First, in S311, the control unit 161 sets the operation mode of the portable system 100 to the search mode. The switch of the operation mode is notified to the management server 200 and the tag reader 110. Next, in S312, the control unit 161 measures the elapsed time from the mode switching in S311 with a timer. Next, in S313, the control unit 161 determines whether the elapsed time from the mode switching has reached a setting value (that is predetermined or designated by a user). In a case where the elapsed time has not reached the setting value, the processing returns to S312, and the measurement of the elapsed time continues. In a case where the elapsed time has reached the setting value, the processing proceeds to S314.

In S314, the control unit 161 sets the operation mode of the portable system 100 to the inspection mode. The switch of the operation mode is notified to the management server 200 and the tag reader 110. Next, in S315, the control unit 161 measures the elapsed time from the mode switching in S314 with a timer. Next, in S316, the control unit 161 determines whether the elapsed time from the mode switching has reached a setting value (that is predetermined or designated by a user). In a case where the elapsed time has not reached the setting value, the processing returns to S315, and the measurement of the elapsed time continues. In a case where the elapsed time has reached the setting value, the processing proceeds to S317.

In S317, the control unit 161 determines whether to terminate operation by the portable system 100 for item inspection. When the operation is continued, the processing returns to S311, and the operation mode is set to the search mode again. When it is determined to terminate the operation, the mode switching processing of FIG. 13 ends.

5. CONCLUSION

Thus far, various embodiments and practical examples of the technology according to the present disclosure have been described in detail using FIGS. 1 to 13. According to the above-described embodiments, there is provided a portable system that is capable of reading, from a first wireless device (position tag) installed at a known position and from a second wireless device (item tag) attached to an item, identification information stored in respective wireless devices. This portable system is capable of operating in one of a plurality of operation modes including a first operation mode (search mode) for estimation of a position of the portable system and a second operation mode (inspection mode) for inspecting whether the item is in a specific place. When the portable system has read identification information from the first wireless device in the first operation mode, an item inspection system estimates a position of the portable system. Then, the item inspection system guides a user for the inspection of a target item based on a position of the item indicated by position information stored in a database and the estimated position of the portable system. When the portable system has read identification information from the second wireless device in the second operation mode, the item inspection system determines that the target item to which the second wireless device is attached is in the specific place. In a situation where target items of the inspection may have moved to arbitrary places, this makes it possible to estimate the current position of the user who carries the portable system, and guide the user to a position of a target item in its vicinity to complete the inspection on the location of the target item using the portable system. Therefore, it will be possible to efficiently inspect locations of items in a situation where the items may move across a plurality of places.

According to the above-described embodiments, each wireless device is an RFID tag, and the portable system includes a reading apparatus that reads information sent back from the RFID tag utilizing energy of electromagnetic waves emitted to a reading range. In this case, a wireless device attached to each item does not need a battery and a complicated transceiver mounted thereon, and the mechanism according to the above-described embodiments can be introduced with low cost even in a situation where there are a large number of items under management of the item inspection system.

According to the above-described embodiments, the portable system is capable of measuring an amount of relative movement relative to a reference position using a self-localization technique. The current position of the portable system is estimated based on the amount of relative movement from a point in time at which the identification information has been read from the first wireless device and the known position of the first wireless device. In this case, there is no need to communicate with an external apparatus such as a GPS satellite or a wireless base station for the purpose of estimating the current position of the portable system (that is, of the user) Therefore, it is possible to adequately guide the user to the position of the target item for item location inspection in an environment where external communication is difficult such as indoor, underground or inside a tunnel.

According to the above-described embodiments, position information indicating a position of each of a plurality of items managed by the item inspection system is managed in a database. Then, in response to the identification information being read from the second wireless device by the portable system, a position indicated by the position information of the item to which the second wireless device is attached is updated based on the estimated current position of the portable system. In this case, the position information of each item is updated to reflect the latest position by a user who carries the portable system just patrolling in the places where the item exists. Therefore, it is possible to guide the user to the latest position of the target item immediately when it comes to the timing at which an inspection (for example, inventory counting work) is required.

According to the above-described embodiments, in a case where the identification information has been read from the first wireless device by the reading unit, one or more target items that exist in the vicinity of the known position of the first wireless device are specified based on the position information in the database. Then, positions of the specified target items are displayed by the portable system together with the estimated current position of the portable system. In this case, the user who carries the portable system visually and easily realizes the positional relationship between the displayed current position and a target item, and can efficiently move close to the target item. Since the displayed current position is updated as the user moves, the user will not lose his or her position while searching for the target item.

According to a practical example, the item inspection system updates an inspection status to inspection completed when the portable system has read the identification information from the second wireless device in the second operation mode and a predetermined user operation to the portable system has been detected. In this case, a user's proactive action can be adopted as a condition for updating the inspection status to inspection completed so that reliability of the inspection can be enhanced.

According to a practical example, the portable system includes: a reading apparatus having a reading unit capable of reading identification information from a wireless device; and a terminal apparatus having a notification unit that performs a notification. In this case, it is possible to make use of a widely-prevailed general-purpose terminal apparatus (for example, a smartphone or a PC) for providing advanced UIs that support the inspection. According to another practical example, the portable system includes a reading apparatus having a reading unit capable of reading identification information from a wireless device and a notification unit that performs a notification. In this case, the user can efficiently perform item location inspection by just carrying the single integrated reading apparatus.

According to the present invention, it will become possible to efficiently inspect locations of items that may move to arbitrary places.

6. OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An item inspection system comprising:
a first wireless device installed at a known position;
a second wireless device attached to an item;
a portable system that includes a reading unit configured to read, from the first and second wireless devices, identification information stored in the respective wireless device;
a position estimation unit configured to estimate a position of the portable system based on a result of reading of identification information from the first wireless device by the reading unit; and
an inspection unit configured to inspect whether the item exists in a specific place based on a result of reading of identification information from the second wireless device by the reading unit,
wherein the portable system is configured to operate in one of a plurality of operation modes including a first operation mode for the estimation of a position of the portable system and a second operation mode for the inspection on the item, and
wherein the inspection unit is configured to:
specify the item for which inspection has not been completed based on a position of the item indicated by position information stored in a database and a position of the portable system estimated by the position estimation unit while the portable system is operating in the first operation mode; and
determine that the specified item exists in the specific place in response to the identification information being read from the second wireless device by the reading unit while the portable system is operating in the second operation mode.

2. The item inspection system according to claim 1, wherein the wireless device is a radio frequency identification (RFID) tag, and
the reading unit is configured to emit an electromagnetic wave to a reading range and read the identification information sent back from the wireless device utilizing energy of the electromagnetic wave.

3. The item inspection system according to claim 2, wherein the reading range of the reading unit of the portable system in the second operation mode is narrower than the reading range of the reading unit of the portable system in the first operation mode.

4. The item inspection system according to claim 2, wherein a detection condition for the reading unit of the portable system in the second operation mode to detect the wireless device is stricter than a detection condition for the reading unit of the portable system in the first operation mode to detect the wireless device.

5. The item inspection system according to claim 1, wherein the portable system is configured to:
perform notification to the user with a predetermined notification pattern when the reading unit has read the identification information from the second wireless device that is a target of the inspection in the second operation mode; and not perform notification to the user with the predetermined notification pattern when the reading unit has read the identification information from the second wireless device in the first operation mode.

6. The item inspection system according to claim 5, wherein the portable system includes:
a reading apparatus that includes the reading unit; and
a terminal apparatus that includes a notification unit configured to perform the notification.

7. The item inspection system according to claim 5, wherein the portable system includes:
a reading apparatus that includes the reading unit and a notification unit configured to perform the notification.

8. The item inspection system according to claim 1, wherein the portable system includes a measuring unit that is configured to measure an amount of relative movement of the portable system relative to a reference position using a self-localization technique, and
the position estimation unit is configured to estimate a current position of the portable system based on the amount of relative movement of the portable system from a point in time at which the reading unit has read the identification information from the first wireless device and the known position of the first wireless device.

9. The item inspection system according to claim 8, wherein the position information stored in the database indicates a position of each of a plurality of items managed by the item inspection system, and
the position estimation unit is configured to update, in response to the identification information being read from the second wireless device by the reading unit, a position indicated by the position information of the item to which the second wireless device is attached based on the estimated current position of the portable system.

10. The item inspection system according to claim 1, wherein the portable system further includes a display unit and,
wherein the inspection unit is configured to, in a case where the identification information has been read from the first wireless device by the reading unit:
specify, based on the position information, one or more items that are targets of the inspection and exist in the vicinity of the known position of the first wireless device; and
cause the display unit of the portable system to display positions of the specified one or more items.

11. The item inspection system according to claim 10, wherein the inspection unit is configured to cause the display unit of the portable system to display a current position of the portable system estimated by the position estimation unit together with positions of the specified one or more items.

12. The item inspection system according to claim 1, wherein the database further stores a status of the inspection performed by the inspection unit for each of a plurality of items, and
wherein the inspection unit is configured to, in a case where it is determined that the item to which the second wireless device is attached exists in the specific place, update the status for that item in the database to a value representing inspection completed.

13. The item inspection system according to claim 12, wherein the inspection unit is configured update the status for the item to which the second wireless device is attached to a value representing inspection completed in a case where the reading unit has read the identification information from the second wireless device while the portable system is operating in the second operation mode and a predetermined user operation to the portable system has been detected.

14. The item inspection system according to claim 1, wherein the portable system is configured to operate in the first operation mode during normal times and operate in the second operation mode when a transition to the second operation mode is instructed.

15. The item inspection system according to claim 1, wherein the portable system is configured to periodically alternate operation in the first operation mode and operation in the second operation mode.

16. An inspection method for inspecting whether an item exists in a specific place using a portable system that is configured to read, from wireless devices, identification information stored in the respective wireless devices, the wireless devices including a first wireless device installed at a known position and a second wireless device attached to the item,
wherein the portable system is configured to operate in one of a plurality of operation modes including a first operation mode for estimation of a position of the portable system and a second operation mode for the inspection on the item,
the inspection method comprising:
setting an operation mode of the portable system to the first operation mode;
reading, by the portable system, identification information of the first wireless device from the first wireless device;
estimating a position of the portable system based on a result of reading of the identification information from the first wireless device;
specifying the item for which inspection has not been completed based on a position of the item indicated by position information stored in a database and an estimated position of the portable system while the portable system is operating in the first operation mode;
setting an operation mode of the portable system to the second operation mode;
reading, by the portable system, identification information of the second wireless device from the second wireless device attached to the specified item; and
determining that the specified item exists in the specific place in response to the identification information being read from the second wireless device while the portable system is operating in the second operation mode.

17. An information processing apparatus comprising:
a communication unit configured to communicate with a portable system that is configured to read, from a first wireless device installed at a known position and from a second wireless device attached to an item, identification information stored in respective wireless devices;
a position estimation unit configured to estimate a position of the portable system based on a result of reading of identification information from the first wireless device by the portable system; and
an inspection unit configured to inspect whether the item exists in a specific place based on a result of reading of identification information from the second wireless device by the portable system, wherein the portable system is configured to operate in one of a plurality of operation modes including a first operation mode for the estimation of a position of the portable system and a second operation mode for the inspection on the item, and the inspection unit is configured to:
specify the item for which inspection has not been completed based on a position of the item indicated by position information stored in a database and a position of the portable system estimated by the position estimation unit while the portable system is operating in the first operation mode; and determine that the specified item exists in the specific place in response to the identification information being read from the second wireless device while the portable system is operating in the second operation mode.

* * * * *